//(12) United States Patent
Tanabe et al.

(10) Patent No.: US 7,580,446 B2
(45) Date of Patent: Aug. 25, 2009

(54) RADIO COMMUNICATION APPARATUS AND RADIO COMMUNICATION METHOD

(75) Inventors: Yasuhiko Tanabe, Kawasaki (JP); Shuichi Obayashi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 587 days.

(21) Appl. No.: 11/313,834

(22) Filed: Dec. 22, 2005

(65) Prior Publication Data

US 2006/0153062 A1 Jul. 13, 2006

(30) Foreign Application Priority Data

Dec. 27, 2004 (JP) ............................. 2004-378092
Dec. 19, 2005 (JP) ............................. 2005-364430

(51) Int. Cl.
*H04B 1/00* (2006.01)
*H04J 11/00* (2006.01)

(52) U.S. Cl. ..................................... 375/146; 370/210

(58) Field of Classification Search ................. 375/130, 375/140, 141, 146, 259, 260, 261, 267, 285, 375/295, 296, 354, 358; 370/203, 204, 206, 370/207, 208, 210; 708/100, 200, 400, 403, 708/404, 405, 800, 801, 820, 821; 455/91, 455/101, 102, 103, 39, 68, 69
See application file for complete search history.

(56) References Cited

U.S. PATENT DOCUMENTS 6,058,105 A 5/2000 Hochwald et al.
6,144,711 A 11/2000 Raleigh et al.
7,386,072 B2 * 6/2008 Uno ............................. 375/344
2004/0178954 A1 * 9/2004 Vook et al. .................... 342/383
2004/0192218 A1 * 9/2004 Oprea ........................... 455/73
2005/0113041 A1 * 5/2005 Polley et al. ................ 455/105
2006/0067277 A1 * 3/2006 Thomas et al. .............. 370/334
2006/0072677 A1 * 4/2006 Kwak et al. .................. 375/260

* cited by examiner

*Primary Examiner*—David C Payne
*Assistant Examiner*—Vineeta S Panwalkar
(74) *Attorney, Agent, or Firm*—Oblon, Spivak, McClelland, Maier & Neustadt, P.C.

(57) ABSTRACT

Radio communication apparatus includes unit dividing transmit data into first-and-second streams, unit subjecting first-and-second streams to serial-to-parallel conversion to obtain data signals, unit modulating data signals into OFDM-modulation signals corresponding to first and second streams using subcarriers, unit acquiring channel responses between communication and receiving apparatuses, unit computing singular values $\lambda_1^{(k)}$ and $\lambda_2^{(k)}$ of channel matrix corresponding to $k^{th}$ subcarrier in subcarriers, based on channel responses, unit assigning weights corresponding to singular values $\lambda_1^{(k)}$ and $\lambda_2^{(k)}$ to first-and-second streams where correspondence of weights to streams is different by subcarrier, unit multiplying, by each of assigned weights, OFDM-modulation signals corresponding to each of first and second streams, and acquire first-and-second signals corresponding to first-and-second streams, unit adding first-and-second signals to acquire added signals, unit subjecting added signals to inverse-Fourier transform, and unit transmitting, to receiving apparatus, signals output from subjecting unit.

20 Claims, 13 Drawing Sheets

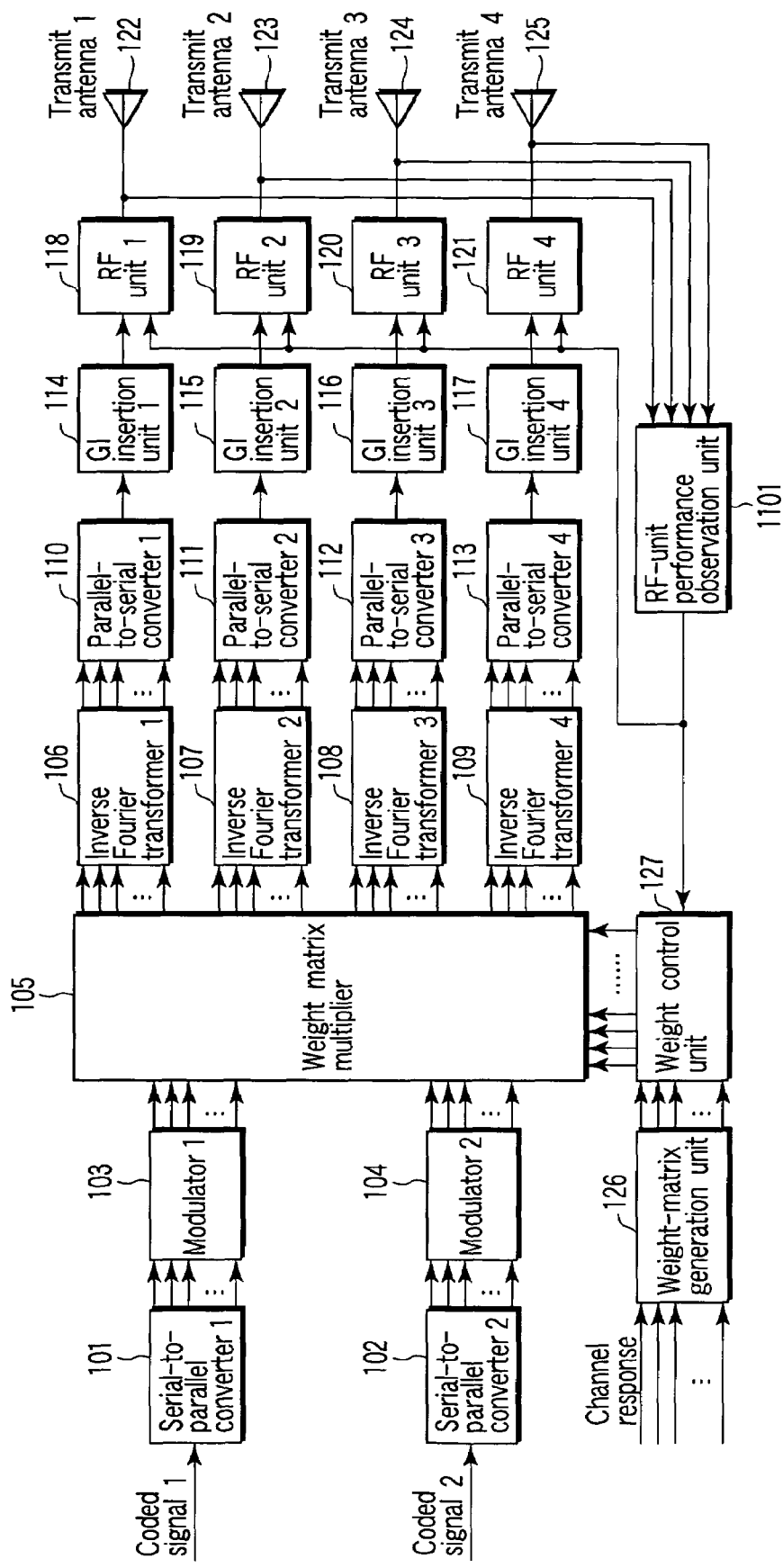
F I G. 11

RADIO COMMUNICATION APPARATUS AND RADIO COMMUNICATION METHOD

CROSS-REFERENCE TO RELATED APPLICATIONS

This application is based upon and claims the benefit of priority from prior Japanese Patent Applications No. 2004-378092, filed Dec. 27, 2004; and No. 2005-364430, filed Dec. 19, 2005, the entire contents of both of which are incorporated herein by reference.

BACKGROUND OF THE INVENTION

1. Field of the Invention

The present invention relates to a radio communication apparatus and method, and more particularly to a radio communication apparatus and method of a spatial multiplex transmission scheme based on OFDM.

2. Description of the Related Art

A method for distributing a transmit signal to a plurality of RF (Radio Frequency) units and simultaneously transmitting signals of the same frequency through a plurality of antennas has been proposed as a technique for enhancing the rate of radio communication (see, for example, U.S. Pat. Nos. 6,058,105 and 6,144,711). In this method, the signals of the same frequency are transmitted with different digital beams, and a receiving terminal receives multiplex signals transmitted through different routes, and separates them to decode them.

As a result, the rate of transmission can be enhanced in accordance with the number of multiplex signals, without widening the frequency bandwidth used for communication. Thus, the method can enhance the spectral efficiency and hence the throughput.

On the other hand, in a multipath channel in which a plurality of signals having different propagation delay times between transmission and receiving terminals are transmitted, waveform distortion due to ISI (Inter Symbol Interference) may be a great factor for degrading the quality of communication. A system using orthogonal frequency division multiplexing (OFDM) is known as a system capable of compensating waveform distortion due to ISI when it receives signals of different propagation delay times.

In OFDM transmission schemes, subcarriers have different channel responses. Accordingly, if the methods proposed in U.S. Pat. Nos. 6,058,105 and 6,144,711 are employed as OFDM transmission schemes, different digital beams are used for different subcarriers. In this case, in the prior art, digital beams that cause all subcarriers to provide high receiving power are assigned to only a particular signal, which inevitably increases the difference in characteristics between spatial multiplex signals. Therefore, signals of a high multilevel modulation number or of a high coding rate must be assigned as the spatial multiplex signals, and accordingly, RF units of high accuracy capable of both transmitting and receiving such signals are required.

As described above, in the conventional radio communication apparatus, a big difference is found in receiving power between multiplexed signals. This means that unless a modulation scheme or coding rate of a high transmission rate is used for signals of a high receiving power, the channel responses of the signals cannot sufficiently be utilized. Accordingly, it is necessary to use an accurate apparatus capable of transmitting and receiving signals of a high transmission rate. There is a demand for the reduction of the cost of the radio communication apparatus and the reduction of chip area of the integrated circuits incorporated in the apparatus.

BRIEF SUMMARY OF THE INVENTION

In accordance with an aspect of the invention, there is provided a radio communication apparatus for transmitting data to a receiving apparatus, comprising: a division unit configured to divide the transmit data into a first stream and a second stream; a serial-to-parallel conversion unit configured to subject the first stream and the second stream to serial-to-parallel conversion to obtain a plurality of data signals; a modulation unit configured to modulate the data signals into a plurality of OFDM modulation signals corresponding to the first stream and the second stream using a plurality of subcarriers; an acquisition unit configured to acquire a plurality of channel responses between the radio communication apparatus and the receiving apparatus; a computation unit configured to compute singular values $\lambda_1^{(k)}$ and $\lambda_2^{(k)}$ of a channel matrix corresponding to a $k^{th}$ (k is a natural number) subcarrier included in the subcarriers, based on the acquired channel responses; a weight assignment unit configured to assign a plurality of weights corresponding to the singular values $\lambda_1^{(k)}$ and $\lambda_2^{(k)}$ to the first stream and the second stream where a correspondence of each weight to each stream is different by subcarrier; a multiplication unit configured to multiply, by each of the assigned weights, the OFDM modulation signals corresponding to each of the first stream and the second stream, and acquire first signals and second signals corresponding to the first stream and the second stream; an addition unit configured to add the first signals and the second signals, and acquire added signals; an inverse Fourier transform unit configured to subject the added signals to inverse Fourier transform; and a transmission unit configured to transmit, to the receiving apparatus, signals output from the inverse Fourier transform unit.

In accordance with another aspect of the invention, there is provided a radio communication apparatus for transmitting data to a receiving apparatus, comprising: a division unit configured to divide the transmit data into at least three streams; a serial-to-parallel conversion unit configured to subject the streams to serial-to-parallel conversion to obtain a plurality of data signals; a modulation unit configured to modulate the data signals into a plurality of OFDM modulation signals corresponding to the at least three streams using a plurality of subcarriers; an acquisition unit configured to acquire a plurality of channel responses between the radio communication apparatus and the receiving apparatus; a computation unit configured to compute singular values $\lambda_1^{(k)}$, $\lambda_2^{(k)}$, ..., $\lambda_m^{(k)}$ (m is a natural number not less than 3) of a channel matrix corresponding to a $k^{th}$ (k is a natural number) subcarrier included in the subcarriers, based on the acquired channel responses; a weight assignment unit configured to assign a plurality of weights corresponding to the singular values $\lambda_1^{(k)}$, $\lambda_2^{(k)}$, ..., $\lambda_m^{(k)}$ to the streams where a correspondence of each weight to each stream is different by subcarrier, if $\lambda_1^{(k)} \geq \lambda_2^{(k)} \geq ... \geq \lambda_m^{(k)}$; a multiplication unit configured to multiply, by each of the assigned weights, the OFDM modulation signals corresponding to each of the streams and acquire m signals; an addition unit configured to add the m signals, and acquire added signals; an inverse Fourier transform unit configured to subject the added signals to inverse Fourier transform; and a transmission unit configured to transmit, to the receiving apparatus, signals output from the inverse Fourier transform unit.

In accordance with another aspect of the invention, there is provided a radio communication apparatus for transmitting data to a receiving apparatus, comprising: a division unit configured to divide the transmit data into at least three streams; a serial-to-parallel conversion unit configured to subject the streams to serial-to-parallel conversion to obtain a plurality of data signals; a modulation unit configured to modulate the data signals into a plurality of OFDM modulation signals corresponding to the at least three streams using a plurality of subcarriers; an acquisition unit configured to acquire a plurality of channel responses between the radio communication apparatus and the receiving apparatus; a computation unit configured to compute singular values $\lambda_1^{(k)}$ and $\lambda_2^{(k)}$ of a channel matrix corresponding to a $k^{th}$ (k is a natural number) subcarrier included in the subcarriers, based on the acquired channel responses; a weight assignment unit configured to assign a plurality of weights corresponding to the singular values $\lambda_1^{(k)}$ and $\lambda_2^{(k)}$ to the OFDM modulation signals corresponding to two of the streams where a correspondence of each weight to each stream is different by subcarrier, if $\lambda_1^{(k)} \geq \lambda_2^{(k)}$; a multiplication unit configured to multiply, by each of the assigned weights, the OFDM modulation signals corresponding to each of the streams and acquire first signals and second signals; an addition unit configured to add the first signals and the second signals, and acquire added signals; an inverse Fourier transform unit configured to subject the added signals to inverse Fourier transform; and a transmission unit configured to transmit, to the receiving apparatus, signals output from the inverse Fourier transform unit.

In accordance with a further aspect of the invention, there is provided a radio communication method used in a radio communication apparatus for transmitting data to a receiving apparatus, comprising: dividing the transmit data into a first stream and a second stream; subjecting the first stream and the second stream to serial-to-parallel conversion to obtain a plurality of data signals; modulating the data signals into a plurality of OFDM modulation signals corresponding to the first stream and the second stream using a plurality of subcarriers; acquiring a plurality of channel responses between the radio communication apparatus and the receiving apparatus; computing singular values $\lambda_1^{(k)}$ and $\lambda_2^{(k)}$ of a channel matrix corresponding to a $k^{th}$ (k is a natural number) subcarrier included in the subcarriers, based on the acquired channel responses; assigning a plurality of weights corresponding to the singular values $\lambda_1^{(k)}$ and $\lambda_2^{(k)}$ to the first stream and the second stream where a correspondence of each weight to each stream is different by subcarrier; multiplying, by each of the assigned weights, the OFDM modulation signals corresponding to each of the first stream and the second stream and acquiring first signals and second signals; adding the first signals and the second signals, and acquiring added signals; subjecting the added signals to inverse Fourier transform; and transmitting, to the receiving apparatus, signals output from the inverse Fourier transform unit.

BRIEF DESCRIPTION OF THE SEVERAL VIEWS OF THE DRAWING

FIG. 11 is a block diagram illustrating a radio communication apparatus according to a fifth embodiment of the invention;

DETAILED DESCRIPTION OF THE INVENTION

Radio communication apparatuses according to embodiments of the invention will be described in detail with reference to the accompanying drawings.

The radio communication apparatus and method can enhance the transmission rate of spatial multiplex signals as a whole, without using any accurate device.

First Embodiment

Figure 1:
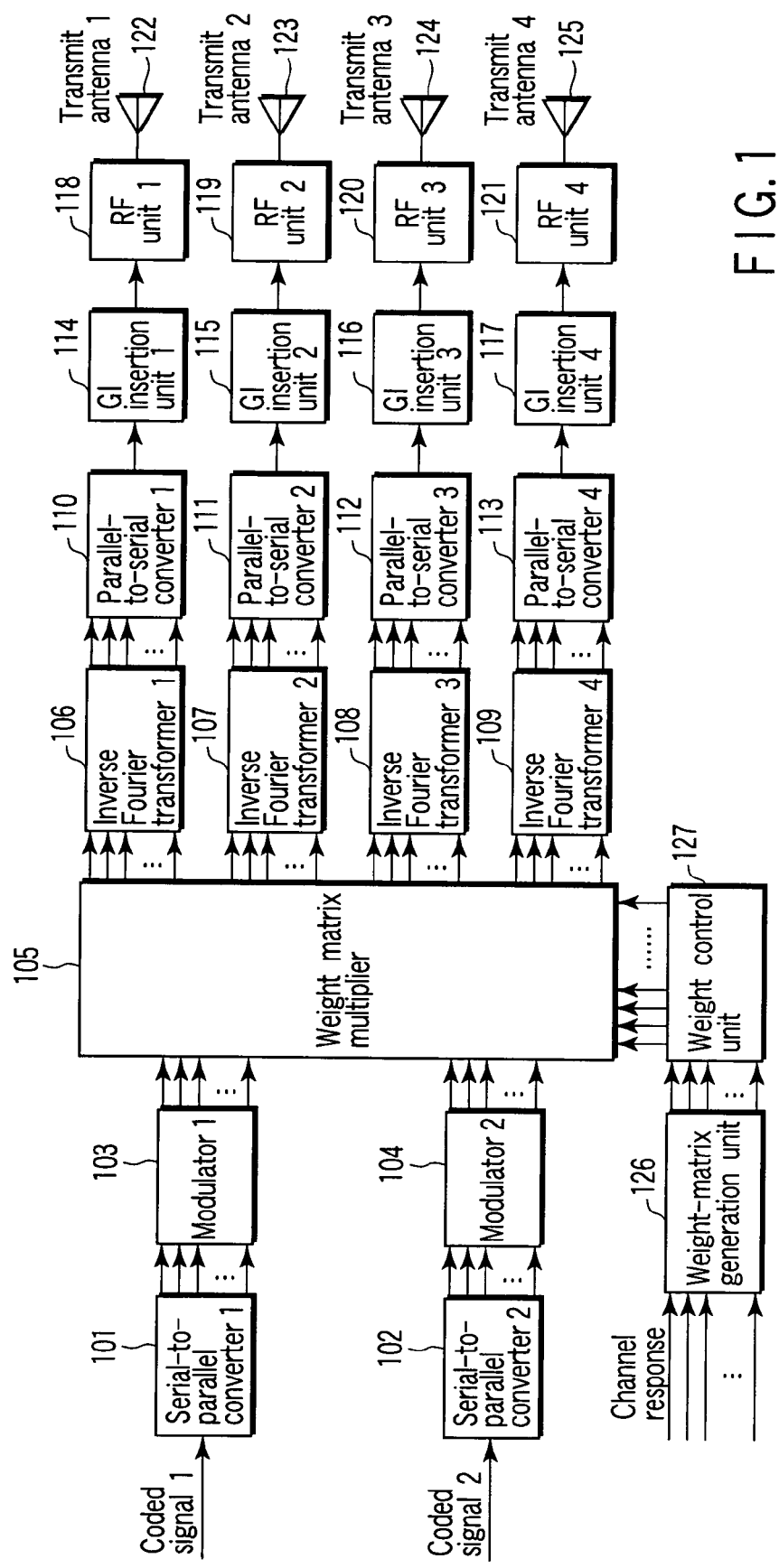
FIG. 1 is a block diagram illustrating a radio communication apparatus according to embodiments of the invention.

Referring first to FIG. 1, a radio communication apparatus according to a first embodiment will be described. FIG. 1 is a block diagram illustrating an example where the number of coded signals to be multiplexed is two, and the number of RF units is four.

As shown, the radio communication apparatus of the first embodiment comprises serial-to-parallel converters 101 and 102, modulators 103 and 104, weight matrix multiplier 105, inverse Fourier transformers 106 to 109, parallel-to-serial converters 110 to 113, GI insertion units 114 to 117, RF units 118 to 121, transmit antennas 122 to 125, weight-matrix generation unit 126 and weight control unit 127. Further, in the example of FIG. 1, the number of coded signals to be multiplexed is two, and the two coded signals 1 and 2 are subjected to OFDM modulation and then to weighting processing by the weight matrix multiplier 105, and are distributed to a plurality of RF units.

The serial-to-parallel converters 101 and 102 distribute the input coded signals 1 and 2 to subcarriers. The serial-to-parallel converters 101 and 102 convert the input coded signals into the same number of parallel signals as data subcarriers for OFDM modulation. For instance, if the number of OFDM data subcarriers is 100, the number of outputs of each serial-to-parallel converter is 100.

Note that the coded signals 1 and 2 may employ any coding scheme, such as Reed-Solomon coding, convolution coding, turbo coding or low-density parity check (LDPC) coding. Further, the encoding scheme of the embodiments is not limited to them. It is sufficient if the receiving terminal can decode signals based on the coding scheme. Coding machine examples for acquiring the coded signals 1 and 2 will be described later with reference to FIGS. 2 and 3.

The modulators 103 and 104 subject, to OFDM modulation, the output signals (i.e., parallel signals) of the serial-to-parallel converters 101 and 102. Namely, the modulators 103 and 104 modulate the coded signals 1 and 2 in units of subcarriers. The modulation scheme employed in the modulators 103 and 104 may be phase shift keying (PSK), such as BPSK or QPSK, or quadrature amplitude modulation (QAM), such as 16 QAM, 32 QAM, 64 QAM or 256 QAM. Moreover, the modulation scheme in the embodiment is not limited to the above-mentioned two modulation schemes, but any other modulation scheme. It is sufficient if a receiving terminal as a destination of the radio communication apparatus of the embodiment can decode the modulation scheme.

The weight-matrix generation unit 126 generates weights based on the channel responses between a transmission terminal and receiving terminal. The weight control unit 127 assigns, to the weight matrix multiplier 105, the weights generated by the weight-matrix generation unit 126.

The weight matrix multiplier 105 receives modulation signals acquired by modulation performed in units of subcarriers, and multiplies them by respective weights assigned by the weight control unit 127, thereby accumulating (multiplexing) signals. In the example of FIG. 1, the weight matrix multiplier 105 distributes coded signals corresponding to the four RF units 118 to 121. The weight matrix multiplier 105 multiplies, by weights corresponding to the number of the RF units, the signals acquired by modulation performed in units of subcarriers. Particulars of the multiplication by the weight matrix multiplier 105 will be described later referring to FIG. 4.

The inverse Fourier transformers 106 to 109 subject the output signals of the weight matrix multiplier 105 to inverse Fourier transform. At this time, inverse Fourier transform may be inverse fast Fourier transform (IFFT) or inverse discrete Fourier transform (IDFT).

The parallel-to-serial converters 110 to 113 subject the output signals of the inverse Fourier transformers 106 to 109 to parallel-to-serial conversion. Namely, the parallel-to-serial converters 110 to 113 each convert received parallel signals into a time-series signal.

The GI insertion units 114 to 117 add guard intervals (GI) to the time-series signals. The guard interval is a scheme generally employed in the OFDM transmission scheme, and does not influence the essence of the embodiments of the present invention. Therefore, no detailed description is given of the guard interval.

The RF units 118 to 121 convert the received signals into analog signals using their respective digital-to-analog (D/A) converters (not shown), then convert the analog signals into RF signals using their respective frequency converters (not shown), and output them to the transmit antennas 122 to 125 via power amplifiers (PA) (not shown). Since the RF units 118 to 121 are general ones and have no particular functions, they are not described in detail. The transmit antennas 122 to 125 may be of any type. It is sufficient if they can transmit signals with a desired frequency.

As described above, the radio communication apparatus of the embodiment transmits modulated signals using different weights in units of subcarriers. As a result, each modulated signal is transmitted with different directive digital beam. Therefore, the radio communication apparatus can significantly change the transmission characteristics in accordance with the weights used for transmission. If optimal weights are determined in accordance with the channel responses between the transmitting and receiving terminals, the radio communication apparatus of the embodiment can perform transmission using the optimal weights. The estimation of channel responses will be described later with reference to FIGS. 5 and 6.

Figure 2:
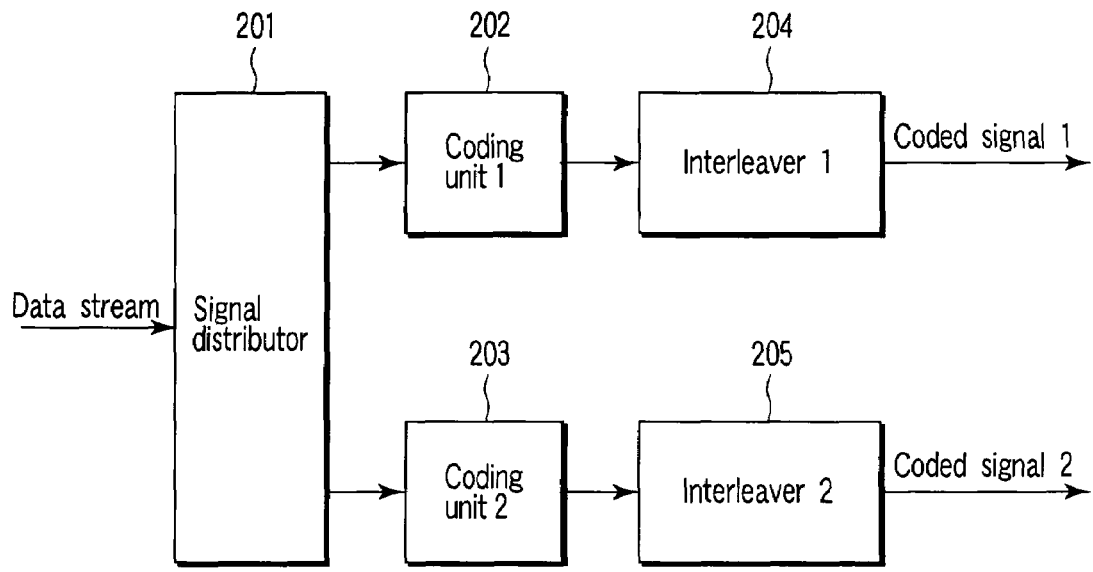
FIG. 2 is a block diagram illustrating a machine example for acquiring the coded signal appearing in FIG. 1.
Figure 3:
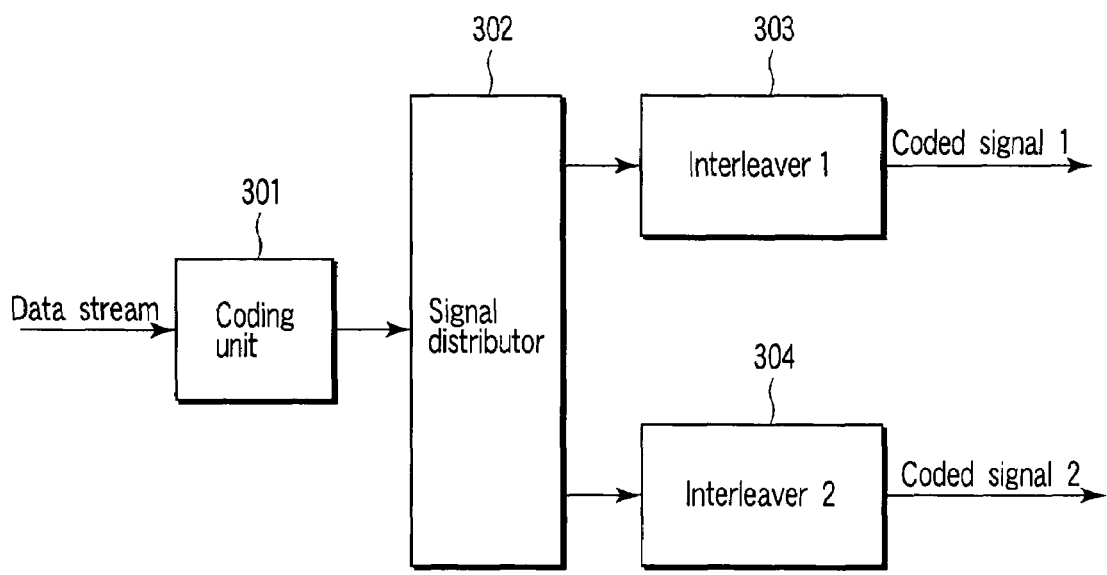
FIG. 3 is a block diagram illustrating another machine example for acquiring the coded signal appearing in FIG. 1.

Referring now to FIGS. 2 and 3, a description will be given of how to generate the coded signals 1 and 2.

The coded signals 1 and 2 input to the serial-to-parallel converters 101 and 102 are acquired by a signal distributor 201 (or 302), coding units 202 and 203 (or 301) and interleavers 204 and 205 (or 303, 304) shown in FIG. 2 (or FIG. 3).

The coding scheme employed in the coding units is, for example, Reed-Solomon coding, convolutional coding, turbo coding or LDPC coding. The coded signals 1 and 2 are acquired by coding a single data stream into two codes. As shown in FIG. 2, the data stream may be divided into two by the signal distributor 201, and then coded by the two coding units 202 and 203. Alternatively, as shown in FIG. 3, the data stream may be first coded by the coding unit 301, and then divided into two by the signal distributor 302. It is sufficient if two coded signals are generated. Furthermore, to prevent burst errors, the interleavers 204 and 205 permute coded signals, thereby changing the order of the signals in an order known to receiving terminals. Note that the interleavers 204 and 205 may permute signals under the same rule or different rules. It is sufficient if the rules are known to the receiving terminals.

Figure 4:
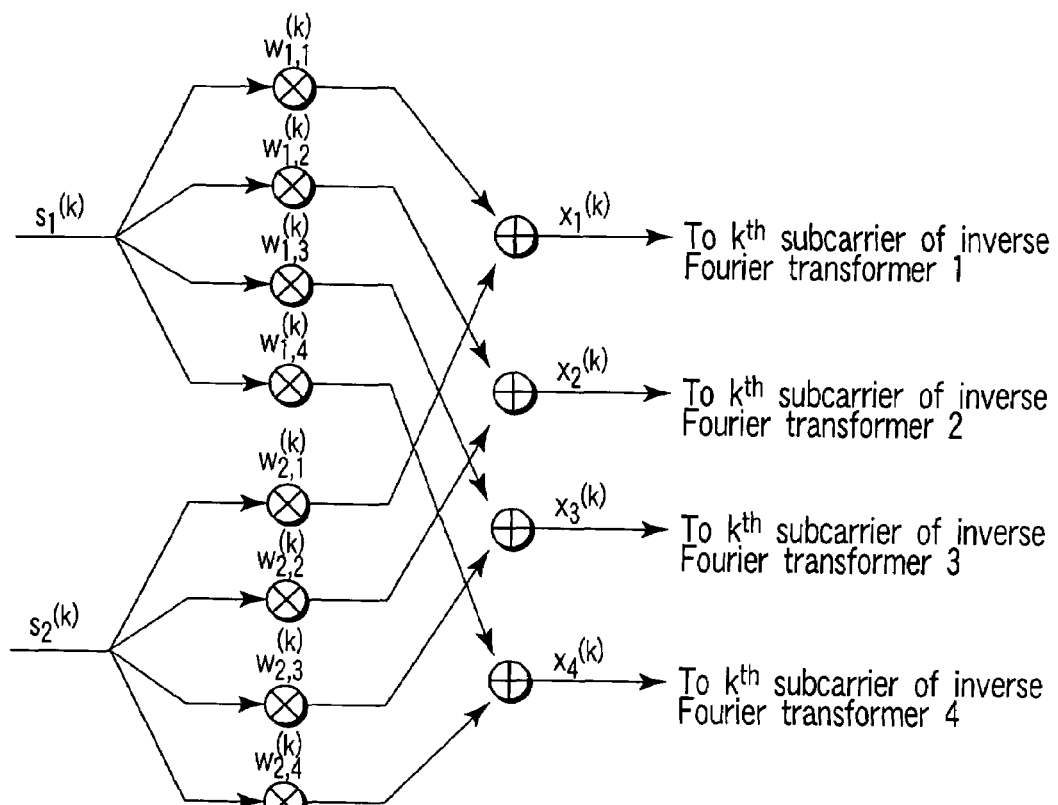
FIG. 4 is a view useful in explaining computation by the weight matrix multiplier.

Referring to FIG. 4, a description will be given of the signals output from the weight matrix multiplier 105 of FIG. 1. FIG. 4 shows the case related to only the $k^{th}$ (k is a natural number) subcarrier used for weight computation by the weight matrix multiplier 105.

Assume here that the modulation signal of the $k^{th}$ subcarrier output from the modulator 103 is $s_1^{(k)}$, and the modulation signal of the $k^{th}$ subcarrier output from the modulator 104 is $s_2^{(k)}$. Since the modulation signals are processed by the four RF units 118 to 121 and transmitted through the four transmit antennas 122 to 125, each modulation signal is multiplied by four weights as shown in FIG. 4. As a result, signal $x_n^{(k)}$ output from the weight matrix multiplier 105 to an inverse Fourier transformer n (n=1, 2, 3, 4) is given by $$x_n^{(k)} = w_{1,n}^{(k)} \cdot s_1^{(k)} + w_{2,n}^{(k)} \cdot s_2^{(k)} \tag{1}$$

Accordingly, a transmit signal vector corresponding to the $k^{th}$ subcarrier and having the output signals of the inverse Fourier transformers 106 to 109 as elements is given by $$\begin{aligned} x^{(k)} &= [x_1^{(k)}, x_2^{(k)}, x_3^{(k)}, x_4^{(k)}]^T \\ &= w_1^{(k)} \cdot s_1^{(k)} + w_2^{(k)} \cdot s_2^{(k)} \end{aligned} \tag{2}$$

-continued $$= [w_1^{(k)}, w_2^{(k)}] \begin{bmatrix} s_1^{(k)} \\ s_2^{(k)} \end{bmatrix}$$

$$= w^{(k)} \begin{bmatrix} s_1^{(k)} \\ s_2^{(k)} \end{bmatrix}$$

In the above equation, $W^{(k)}$ is weight matrix and $W_1^{(k)}$ and $W_2^{(k)}$ are weight vectors and are given by $$w_1^{(k)} = [w_{1,1}^{(k)}, w_{1,2}^{(k)}, w_{1,3}^{(k)}, w_{1,4}^{(k)}]^T \quad (3\text{-}1)$$

$$w_2^{(k)} = [w_{2,1}^{(k)}, w_{2,2}^{(k)}, w_{2,3}^{(k)}, w_{2,4}^{(k)}]^T \quad (3\text{-}2)$$

where T represents transposition. The weight matrix multiplier 105 outputs $x_n^{(k)}$ to the inverse Fourier transformer n. A method for determining the weight will be described immediately after a method for acquiring channel responses is described referring to FIGS. 5 and 6.

Figure 5:
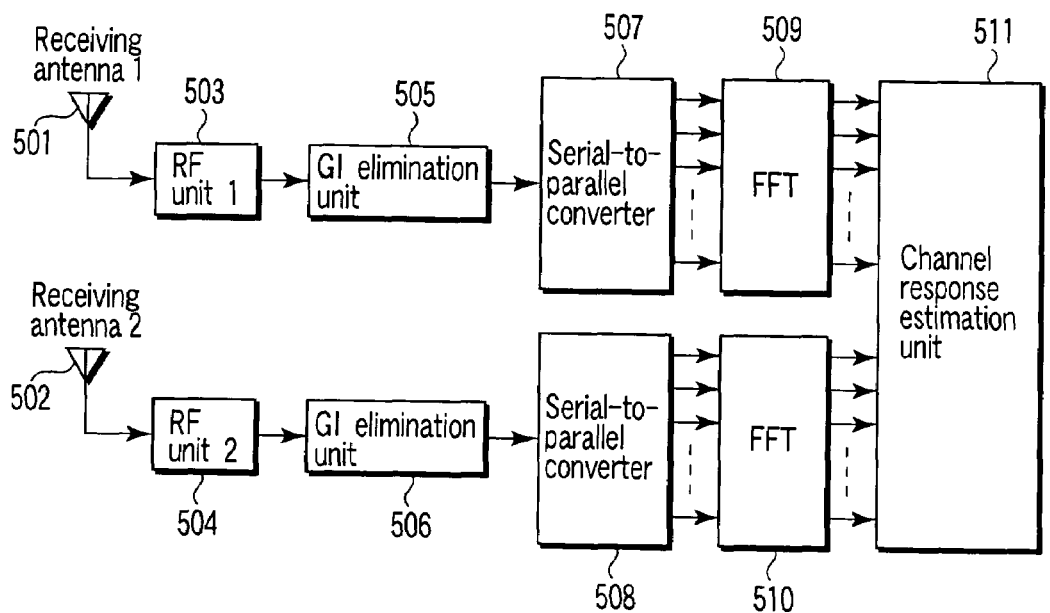
FIG. 5 is a block diagram illustrating a machine incorporated in a receiving terminal for performing channel response estimation.

Referring now to FIG. 5, a description will be given of an example of a channel response estimation unit incorporated in a receiving terminal for sending channel responses to the radio communication apparatus of the embodiment.

A method for sending, to a radio communication apparatus, the channel responses estimated by a receiving terminal is exemplified as one of the methods for sending channel responses to a radio communication apparatus. In general, in radio communication, a known signal for channel response estimation is transmitted along with a data signal, therefore the receiving terminal can estimate the channel response using the known signal.

As shown in FIG. 5, the receiving terminal for sending channel responses to the radio communication apparatus of the embodiment comprises receiving antennas 501 and 502, RF units 503 and 504, GI elimination units 505 and 506, serial-to-parallel converters 507 and 508, FFT units 509 and 510 and channel response estimation unit 511.

The RF units 503 and 504 convert, into digital signals, the signals received via the receiving antennas 501 and 502, respectively. Each of the RF units 503 and 504 is a general RF unit that includes a low-noise amplifier, frequency converter, filter and analog-to-digital (A/D) converter, therefore will not be described in detail.

The GI elimination units 505 and 506 eliminate guard intervals from digital signals as the output signals of the RF units 503 and 504, respectively.

The serial-to-parallel converters 507 and 508 convert, into parallel signals, the digital signals or time-series signals from which the guard intervals are eliminated.

The FFT units 509 and 510 convert the parallel signals into frequency-domain signals. The FFT units may be replaced with DETs. It is sufficient if they can convert time-domain signals into frequency-domain signals.

The channel response estimation unit 511 estimates channel responses based on the output signals of the FFT units 509 and 510. This will now be described in detail.

Assume here that the signal of the $k^{th}$ subcarrier received by the receiving antenna m and RF unit m of the receiving terminal and converted by the corresponding FFT unit into a frequency-domain signal is $y_m^{(k)}$. In this case, the receiving vector $y^{(k)}$ including the signals received by the RF units 503 and 504 as elements is given by $$y^{(k)} = [y_1^{(k)}, y_2^{(k)}]^T \quad (4)$$

$$= H^{(k)} x^{(k)} + n^{(k)}$$

where $n^{(k)}$ is a noise vector indicating the noises, corresponding to the $k^{th}$ subcarrier, of the RF units incorporated in the receiving terminal. Further, in the equation (4), the number of the RF units incorporated in the receiving terminal is set to 2. However, the number of the RF units is not limited to 2. It is sufficient if the receiving terminal can receive the multiplex signal transmitted from the radio communication apparatus.

$H^{(k)}$ in the equation (4) is a channel matrix that corresponds to the $k^{th}$ subcarrier and uses, as elements, the responses between the transmitting and receiving terminals. The dimension of the channel matrix is (the number of the RF units incorporated in the receiving terminal)×(the number of the RF units incorporated in the radio communication apparatus). In the examples of FIGS. 1 and 5, the number of the RF units (118 to 121) incorporated in the radio communication apparatus is 4, and the number of the RF units (503 and 504) incorporated in the receiving terminal is 2, as is expressed in the equations (2) and (4). Accordingly, the channel matrix is a matrix of (2×4).

In general, in radio communication, if the channel response matrix $H^{(k)}$ is unknown, received signals cannot be decoded. Therefore, the radio communication apparatus transmits a signal, known to the receiving terminal, as the transmission signal $x^{(k)}$ included in the equation (4) for channel response estimation. The channel response estimation unit 511 can estimate the channel response matrix $H^{(k)}$ from the acquired signals $y^{(k)}$ and $x^{(k)}$.

Figure 6:
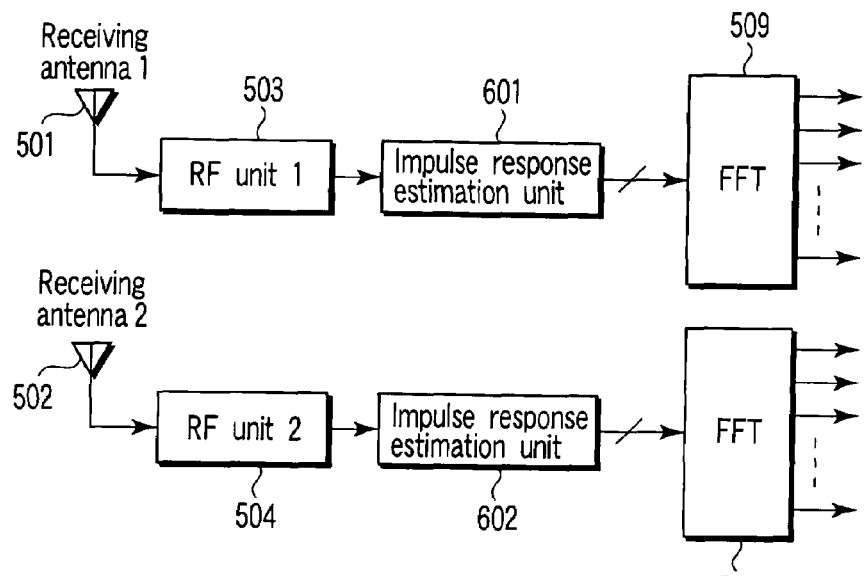
FIG. 6 is a block diagram illustrating another machine incorporated in a receiving terminal for performing channel response estimation.

Referring to FIG. 6, a description will be given of a channel-response estimation machine for estimating impulse responses and performing Fourier transform on the impulse responses, different from that of FIG. 5, which is incorporated in the receiving terminal that sends channel responses to the radio communication apparatus of the embodiment.

The receiving terminal shown in FIG. 6 comprises receiving antennas 501 and 502, RF units 503 and 504, impulse-response estimation units 601 and 602, and FFT units 507 and 508. In FIG. 6, elements similar to those of FIG. 5 are denoted by corresponding reference numerals, and no description will be given thereof.

The impulse-response estimation units 601 and 602 receive digital signals as the output signals of the RF units 503 and 504, and estimate impulse responses from the digital signals. The FFT units 509 and 510 perform Fourier transform on the impulse responses to acquire channel responses. Although in the case of FIG. 6, FFT units are used to perform Fourier transform, any scheme other than the FFT units may be employed. It is sufficient if time-domain signals can be converted into frequency-domain signals.

In the configuration of FIG. 6, impulse responses are estimated using a known signal transmitted from the radio communication apparatus, as in the case of FIG. 5. Further, the impulse-response estimation units 601 and 602 employ, for example, the least square method or minimum mean square error (MMSE) method as a scheme for estimating impulse responses from a known signal. Since these methods are not essential to the embodiments of the present invention, no detailed description will be given thereof. Also, the estimation scheme is not limited to the least square method or minimum mean square method, but any scheme that can perform impulse response estimation may be employed.

As described above with reference to FIGS. 5 and 6, channel responses are sent to the radio communication apparatus by transmitting thereto the channel responses acquired by the receiving terminal. In general, in radio communication except for broadcasting, the radio communication apparatus of the embodiment and receiving terminal mutually access each other. Namely, one of the terminals, which transmits a signal to the other at a certain time, receives a signal therefrom at another time. Accordingly, the receiving terminal can transmit the estimated channel responses to the radio communication apparatus. Thus, the receiving terminal feeds the estimated channel responses back to the radio communication apparatus, whereby the radio communication apparatus can acquire the channel responses.

Further, as described above, in general, the radio communication apparatus and receiving terminal mutually access each other, therefore the former sometimes receives a signal transmitted from the latter. In this case, the responses of the channels from the receiving terminal to the radio communication apparatus can be estimated by the method described with reference to FIGS. 5 and 6, using the known signal for channel response estimation attached to the signal. If the same frequency is used for communication, the responses of the channels from the receiving terminal to the radio communication apparatus are substantially the same as those of the channels from the radio communication apparatus to the receiving terminal. Accordingly, channel responses for transmission can be estimated from those estimated during receiving.

As described above, in the radio communication apparatus, several methods for acquiring channel responses are possible. The radio communication apparatus of the embodiment may employ any one of the methods.

A description will now be given of a method for determining weights, using the weight matrix multiplier 105 and based on the channel responses acquired as described above. The weight-matrix generation unit 126 determines the weights.

It is known that the weight vectors $w_1^{(k)}$ and $w_2^{(k)}$ corresponding to the radio communication apparatus of FIG. 1 can be optimized by performing singular value decomposition (SVD) on the channel matrix. The channel matrix $H^{(k)}$ can be expressed by the following equation (5) using SVD:

$$H^{(k)} = U^{(k)} D^{(k)} V^{(k)H} \qquad (5)$$

$$= [u_1^{(k)}, u_2^{(k)}] diag[\lambda_1, \lambda_2] \begin{bmatrix} v_1^{(k)H} \\ v_2^{(k)H} \end{bmatrix}$$

$$= \lambda_1 u_1^{(k)} v_1^{(k)H} + \lambda_2 u_2^{(k)} v_2^{(k)H}$$

where H represents complex conjugate transposition, diag [ ] is a diagonal matrix, $u_1^{(k)}$ and $u_2^{(k)}$ are vectors having the same number of elements as RF units of receiving terminals, and $v_1^{(k)}$ and $v_2^{(k)}$ are vectors having the same number of elements as RF units of the radio communication apparatus. These vectors are orthogonal vectors that satisfy the following equations (6-1) and (6-2):

$$v_i^{(k)H} v_j^{(k)} = \delta_{ij} \qquad (6\text{-}1)$$

$$u_i^{(k)H} u_j^{(k)} = \delta_{ij} \qquad (6\text{-}2)$$

where $\delta_{ij}$ is the Kronecker's delta expressed by the following equation (7):

$$\delta_{ij} = \begin{cases} 1 & (i = j) \\ 0 & (i \neq j) \end{cases} \qquad (7)$$

The radio communication apparatus uses $v_1^{(k)}$ and $v_2^{(k)}$ as weight vectors and sends them to transmit signals. If $v_1^{(k)}$ ($w_1^{(k)} = v_1^{(k)}$) is used as the transmit signal $s_1^{(k)}$, and $v_2^{(k)}$ ($w_2^{(k)} = v_2^{(k)}$) is used as the transmit signal $s_2^{(k)}$, the received signal expressed by the equation (4) can be expressed by the following equation (8):

$$y^{(k)} = \lambda_1^{(k)} u_1^{(k)} s_1^{(k)} + \lambda_2^{(k)} u_2^{(k)} s_2^{(k)} + n^{(k)} \qquad (8)$$

Since $u_1^{(k)}$ and $u_2^{(k)}$ are orthogonal (refer the equation (6)), $s_1^{(k)}$ and $s_2^{(k)}$ can be extracted by multiplying the received signal $y^{(k)}$ by $u_1^{(k)H}$ and $u_2^{(k)H}$, as is expressed by the following expressions (9-1) and (9-2):

$$s_1^{(k)} \approx u_1^{(k)H} \cdot y^{(k)} / \lambda_1^{(k)} \qquad (9\text{-}1)$$

$$s_2^{(k)} \approx u_2^{(k)H} \cdot y^{(k)} / \lambda_2^{(k)} \qquad (9\text{-}2)$$

In addition to the above method, the zero forcing (ZF) method for multiplying the generalized inverse matrix of a channel response matrix, the MMSE method for multiplying a weight matrix that minimizes the mean value of a square error, or a method for executing maximum likelihood detection using a replica signal is exemplified as the method for extracting a transmit signal from a received signal. In the embodiment, the receiving method is not limited to a particular one, but any scheme other than the above may be employed.

The SN ratio, at the receiving terminal, of the signals $s_1^{(k)}$ and $S_2^{(k)}$ extracted from the received signal can be expressed by the following expressions (10-1) and (10-2):

$$(\lambda_1^{(k)})^2 |s_1^{(k)}|^2 / \|n^{(k)}\|^2 \qquad (10\text{-}1)$$

$$(\lambda_2^{(k)})^2 |s_2^{(k)}|^2 / \|n^{(k)}\|^2 \qquad (10\text{-}2)$$

where the absolute-value mark surrounding $n^{(k)}$ expresses the square norm of the vector. Since the mean power is constant between modulation signals to be multiplexed, it is evident that the SN ratio of each spatial multiplex signal of the $k^{th}$ subcarrier is determined by the singular values $\lambda_1^{(k)}$ and $\lambda_2^{(k)}$ of the channel matrix corresponding to the $k^{th}$ subcarrier. Further, since subcarriers have different channel matrices in an environment in which a plurality of multiplex waves of different delay times are transmitted, the SN ratio differs between the subcarriers.

If a weight vector of a higher singular value is assigned to only a particular signal in each subcarrier, i.e., if $\lambda_1^{(k)} \geq \lambda_2^{(k)}$ and the weight $w_1^{(k)}$ of the signal $s_1^{(k)}$ is set to $v_1^{(k)}$, the SN ratio of each signal modulated by the modulator 103 of FIG. 1 is greater than that of each signal modulated by the modulator 104 of FIG. 1, in each subcarrier. Thus, the signal modulated by the modulator 103 differs in quality from that modulated by the modulator 104.

To perform efficient communication in the above-described environment, it is necessary to transmit the coded signals 1 and 2 (shown in FIG. 1) with the transmission rate of the signal 1 set higher than that of the signal 2. To increase the transmission rate, it is necessary to increase the coding rate or the multi-level modulation number of the modulator. However, if the transmission rate is increased, the transmission signals will be significantly influenced by imperfection of analog circuits, such as the non-linear distortion of the power amplifier, since transmit signals are required to be generated accurately. As a result, no sufficient performance can be acquired even if the channel responses are high.

In light of the above, in the first embodiment of the invention, the weight control unit 127 performs control for assigning weights so that signal streams can have the same characteristics at the receiving side.

Figure 7:
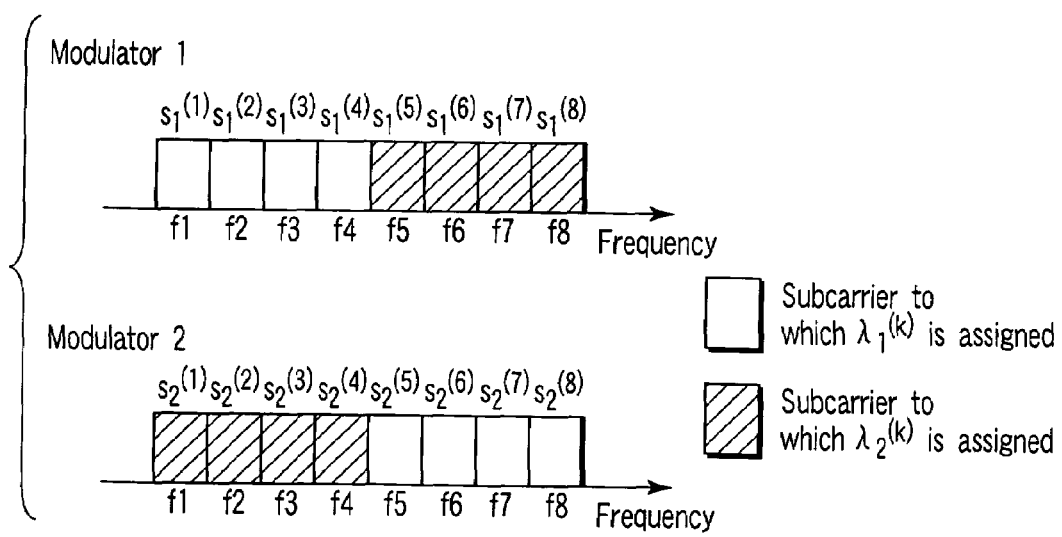
FIG. 7 is a view illustrating an assignment example of weight vectors in a first embodiment.

Referring to FIG. 7, a description will be given of weight assignment control performed by the radio communication apparatus of the first embodiment. In the case of FIG. 7, the number of subcarriers is 8. Concerning the signals modulated by the modulator 103, vectors $v_1^{(1)}$, $v_1^{(2)}$, $v_1^{(3)}$ and $v_1^{(4)}$ corresponding to the respective higher singular values $\lambda_1^{(k)}$ are assigned to the subcarriers $f_1$, $f_2$, $f_3$ and $f_4$, while vectors $v_2^{(5)}$, $v_2^{(6)}$, $v_2^{(7)}$ and $v_2^{(8)}$ corresponding to the respective lower singular values $\lambda_2^{(k)}$ are assigned to the subcarriers $f_5$, $f_6$, $f_7$ and $f_8$.

In contrast, concerning the signals modulated by the modulator 104, vectors $v_2^{(1)}$, $v_2^{(2)}$, $v_2^{(3)}$ and $v_2^{(4)}$ corresponding to the respective lower singular values $\lambda_2^{(k)}$ are assigned to the subcarriers $f_1$, $f_2$, $f_3$ and $f_4$, while vectors $v_1^{(5)}$, $v_1^{(6)}$, $v_1^{(7)}$ and $v_1^{(8)}$ corresponding to the respective higher singular values $\lambda_1^{(k)}$ are assigned to the subcarriers $f_5$, $f_6$, $f_7$ and $f_8$. As a result, in the subcarriers $f_1$, $f_2$, $f_3$ and $f_4$, the signals modulated by the modulator 103, i.e., the encoded signals 1, are received with an SN ratio higher than that of the encoded signals 2, while in the subcarriers $f_5$, $f_6$, $f_{7\ and\ f8}$, the encoded signals 2 are received with a higher SN ratio. This being so, the encoded signals 1 and 2 are transmitted with substantially the same SN ratio as a whole.

The above-described weight assignment concerning the subcarriers will be compared with the case where regardless of the subcarriers, a singular vector corresponding to a higher singular value is assigned as a weight vector to only a particular signal, and a singular vector corresponding to a lower singular value is assigned as a weight vector to the other signal. In the latter case, assume that the channel response of the signal with the higher singular value is much superior to that of the other signals. Also, assume that 256 QAM is selected as a modulation scheme suitable for the superior channel response and used to transmit the signal with the higher singular value, and the 16 QAM is selected and used to transmit the signals with the lower singular value.

In the former case, i.e., in the radio communication apparatus of the first embodiment, since all signals have substantially the same receiving power, they can be transmitted by 64 QAM. In contrast, in the former case, the transmitting and receiving terminals must employ RF units that can transmit and receive signals of 256 QAM. In general, the larger the multi-level modulation number, the higher accuracy the RF unit must have. Further, since the signals significantly differ in receiving power, the load on the RF units is not small. On the other hand, in the radio communication apparatus of the first embodiment, the signals can have a relatively uniform receiving power, therefore the RF units are prevented from being excessively loaded, without reducing the entire throughput.

As described above, in the first embodiment, the difference in characteristics between spatial multiplex signals is reduced to suppress the load on the transmitting and/or receiving terminal. Accordingly, no accurate apparatuses are needed. Even a standard apparatus can sufficiently utilize the channel responses by increasing the transmission rate of spatial multiplex signals as a whole, instead of increasing the transmission rate of a particular signal. Further, since no accurate apparatuses are necessary, the required chip area can be reduced. Moreover, to enhance the accuracy of channel response estimation at the receiving terminal, the channel response of a certain subcarrier can be estimated from the weighted sum of the estimated channel responses of subcarriers near the certain subcarrier, utilizing the correlation of channel response between that of the neighbor subcarriers. If weight vectors are assigned as shown in FIG. 7, the correlations of channel response within the subcarriers $f_1$ to $f_4$ and within $f_5$ to $f_8$ increase, which means that the weighted sum of the channel responses of the neighbor subcarriers can be utilized. Although the number of carriers is set to eight in the embodiment, the invention is not limited to this.

Second Embodiment

A radio communication apparatus according to a second embodiment is similar in configuration to that of the first embodiment shown in FIG. 1, and also similar to the first embodiment in that different beams corresponding to subcarriers are used to multiplex signals for transmission. The second embodiment differs from the first embodiment in the way of assignment, to spatial multiplex signals in units of subcarriers, of singular vectors corresponding to higher and lower singular values.

The channel response differs between subcarriers, and the mean power of the subcarriers $f_1$ to $f_4$ is not always equal to that of the subcarriers $f_5$ to $f_8$. It is also possible that in a subcarrier of a high mean power, a modulation signal, to which a singular vector corresponding to a higher singular value is assigned, will have high characteristics.

Figure 8:
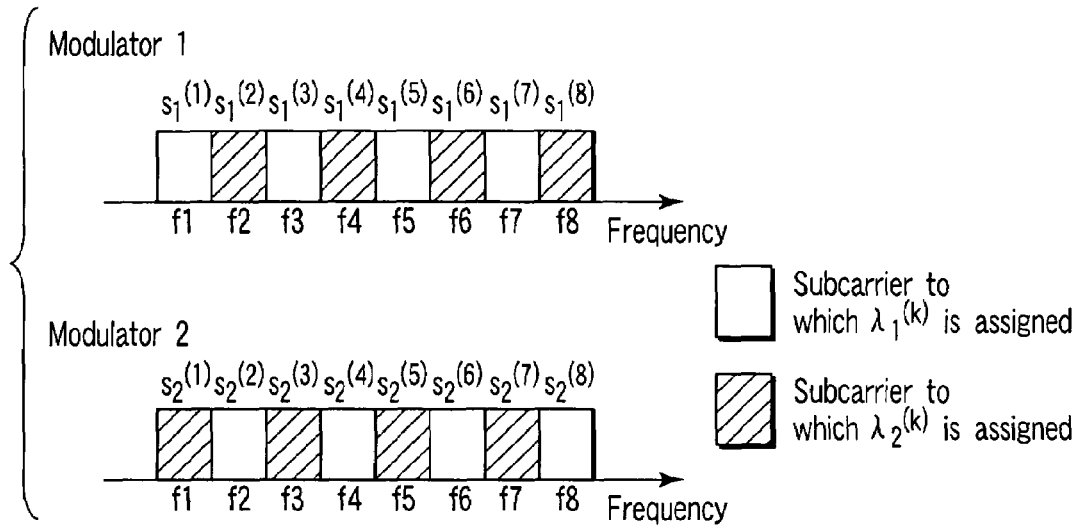
FIG. 8 is a view illustrating an assignment example of weight vectors in a second embodiment.

The second embodiment is directed to a way of assignment of weights for overcoming the non-uniformity in characteristic difference between modulation signals found in the above case. FIG. 8 shows an assignment example of weight vectors to subcarriers in the second embodiment. In this example, weights are assigned to modulation signals so that singular vectors corresponding to high singular values are assigned to every second subcarrier. Specifically, concerning the signals modulated by the modulator 103, the singular vectors $v_1^{(1)}$, $v_1^{(3)}$, $v_1^{(5)}$ and $v_1^{(7)}$ corresponding to the respective higher singular value are assigned to the subcarriers $f_1$, $f_3$, $f_5$ and $f_7$, respectively, and vectors $v_2^{(2)}$, $v_2^{(4)}$, $v_2^{(6)}$ and $v_2^{(8)}$ corresponding to the respective lower singular value are assigned to the subcarriers $f_2$, $f_4$, $f_6$ and $f_8$, respectively.

Although the subcarriers have different channel responses, the channel responses are not completely irrelevant to each other. In general, the closer the subcarriers, the higher correlation they have. Accordingly, if singular vectors corresponding to higher and lower singular values are alternately assigned as weights to modulation signals of adjacent subcarriers as in the second embodiment, the difference in channel power between modulation signals can be further reduced than in the first embodiment.

Figure 9:
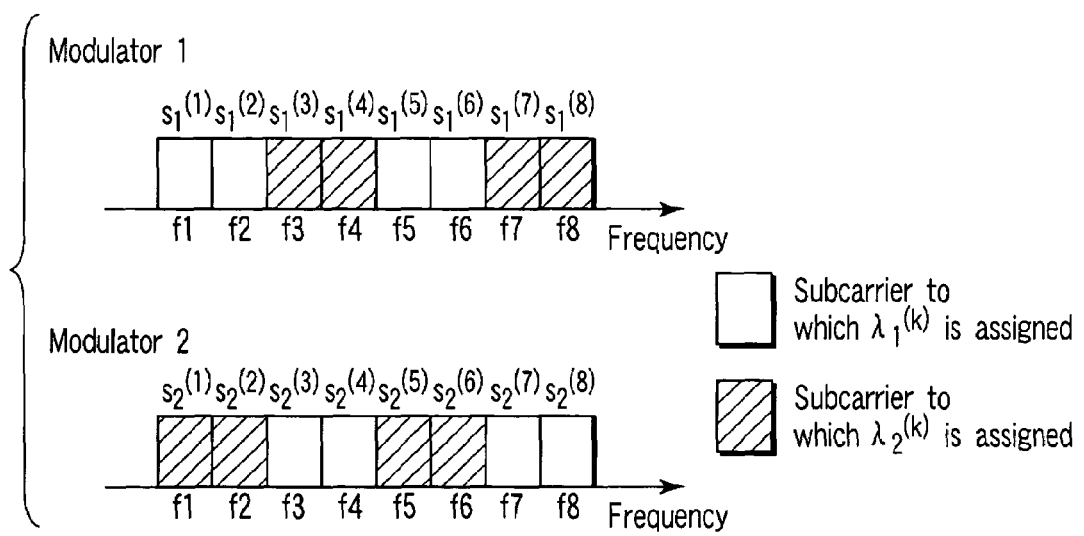
FIG. 9 is a view illustrating another assignment example of weight vectors in the second embodiment.

As described above, in the second embodiment, it is proposed to assign the singular vectors corresponding to the higher and lower singular values, to modulation signals of adjacent subcarriers. However, it is considered that the correlation in channel response between some subcarriers close to each other, as well as between adjacent subcarriers, is relatively high. Accordingly, as shown in FIG. 9, assignment of singular vectors may be switched in units of two or more subcarriers. This enables the channel responses of certain subcarriers to be subjected to weighted sum computation utilized when the receiving terminal estimates the channel response of a given subcarrier, as in the first embodiment. As a result, the same advantage as acquired in the first embodiment can also be acquired.

As described above, the second embodiment can reduce the difference in characteristics between spatial multiplex signals, thereby reducing the load on the RF units.

Third Embodiment

A radio communication apparatus according to a third embodiment is similar in configuration to that of FIG. 1, and also similar to the first and second embodiment in that different beams corresponding to subcarriers are used to multiplex signals for transmission. The third embodiment differs from the first and second embodiments in that when singular vectors corresponding to higher singular values are assigned to spatial multiplex signals in units of subcarriers, the way of assignment is changed in accordance with subcarriers to which the components of a continuous coded signal before interleaver permute it.

If convolutional coding is employed as a coding scheme in the radio communication apparatus according to the third embodiment, the use of interleavers is necessary since convolutional coding does not exhibit a high error correction capacity against continuous errors. Accordingly, adjacent subcarriers are not assigned to the continuous signal, but separate subcarriers are assigned thereto.

On the other hand, where a weight that provides high receiving power and a weight that provides low receiving power are assigned in units of subcarriers as in the previously described embodiments, if the weight control unit 127 performs weight assignment without considering the use of the interleavers, it is possible that a weight that causes low receiving power may be successively assigned to the outputs of the coding unit. This may offset the effect of the interleavers, thereby degrading the error correction capacity.

If the whole width of several subcarriers, in units of which the components of the continuous coded signal are distributed, is made equal to that of several subcarriers, in units of which the way of weight assignment is changed, the high-power components and low-power components of the signal acquired after coding can appear alternately.

The above-described method will be described in more detail, using, as an example, an interleaver according to IEEE 802.11a. In IEEE 802.11a, convolutional coding is employed as a coding scheme. The components of the signal acquired after coding are changed in order by the interleaver, then distributed to subcarriers, and modulated in units of subcarriers. As a result, under the order-changing rule of the interleaver of IEEE 802.11a, the components of the coded signal are distributed to every third subcarrier. Namely, the components are distributed to subcarriers $f_1, f_4, f_7, \ldots$.

Figure 10:
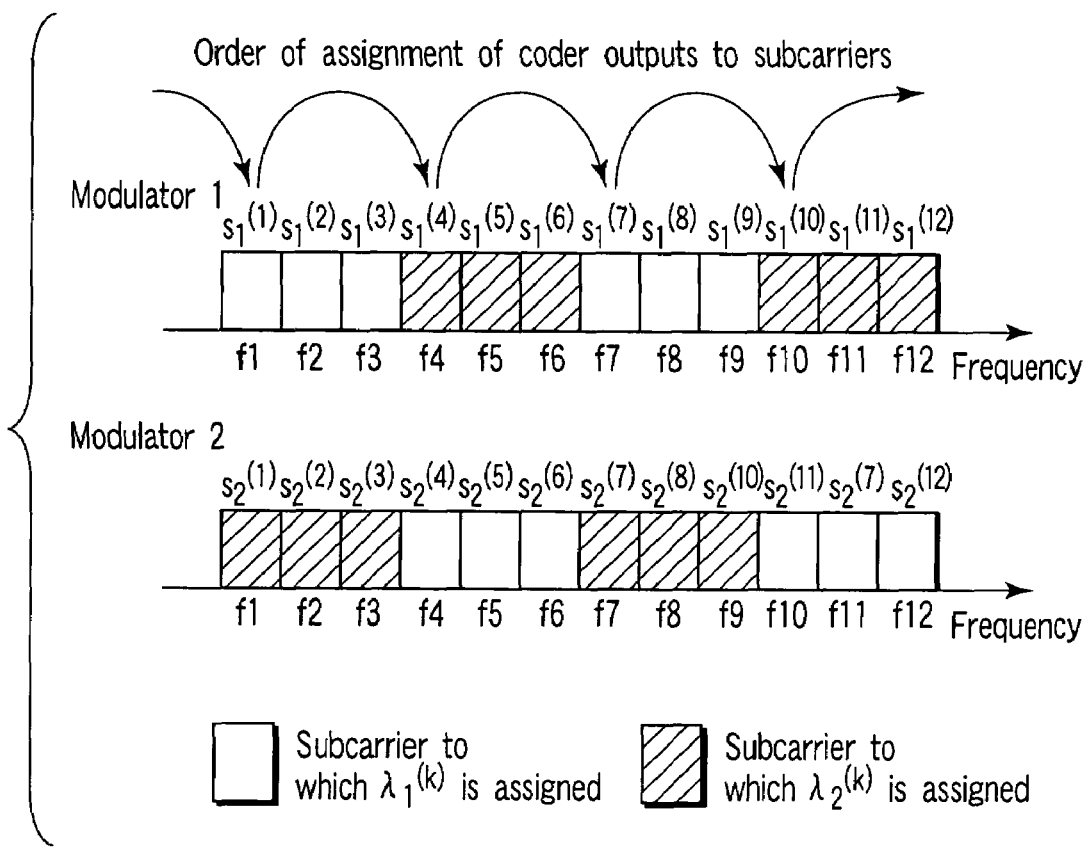
FIG. 10 is a view illustrating an assignment example of weight vectors in a third embodiment.

When such an interleaver as the above is used, the weight control unit 127 of the embodiment assigns a weight, which provides high receiving power, to modulation signals output from the modulator 103 and distributed to subcarriers $f_1, f_2$ and $f_3$, and assigns a weight, which provides low receiving power, to modulation signals output from the modulator 103 and distributed to subcarriers $f_4, f_5$ and $f_6$, as is shown in FIG. 10. As a result, the modulation signals alternately exhibit high receiving power and low receiving power, which prevents degradation of the error correction performance. The same can be said of the modulation signals output from the modulator 104. Thus, the modulation signals output from the modulators 103 and 104 can exhibit, as a whole, substantially the same receiving power. Further, these modulation signals alternately exhibit high receiving power and low receiving power, which prevents degradation of the error correction performance.

As described above, in the third embodiment, the load on a transmitting or receiving terminal can be reduced by reducing the difference in characteristics between spatial multiplex signals. Accordingly, no accurate devices are necessary. Even a standard apparatus can sufficiently utilize the channel responses by increasing the transmission rate of spatial multiplex signals as a whole, instead of increasing the transmission rate of a particular signal. Further, since no accurate apparatuses are necessary, the required chip area can be reduced. Moreover, since the outputs of the encoder do not continuously exhibit low power, but alternately exhibit high power and low power, excellent error correction performance can be realized. Although in the third embodiment, the number of subcarriers is set to 12 as shown in FIG. 10, but it is not limited to 12.

Fourth Embodiment

A radio communication apparatus according to a fourth embodiment is similar in configuration to that of FIG. 1, and also similar to the first to third embodiment in that different beams corresponding to subcarriers are used to multiplex signals for transmission. The fourth embodiment differs from the first to third embodiments in that in the former, a weight, which provides high receiving power, is assigned to modulation signals output from different modulators and corresponding to subcarriers, only if the mean of singular values of each channel matrices exceeds a preset threshold value.

If a weight, which provides high receiving power, is assigned only to modulation signals of all subcarriers, output from a particular modulator, the receiving power of the modulation signals of the particular modulator becomes conspicuous as described in the first embodiment. When the absolute value of the channel response is low, even if power is concentrated on modulation signals output from a particular modulator, a high-order multi-level modulation scheme may not be employed. In this case, however, since the absolute value of the channel response is low, the above problem will not occur. Therefore, even if such weight assignment control as described in the first to third embodiments is performed, a significant advantage will not be acquired.

In light of this, in the fourth embodiment, the weight control unit 127 detects the maximum singular value of the channel matrices acquired by the weight-matrix generation unit, and performs weight control using the scheme described in the first, second or third embodiment, only if the maximum singular value is not less than a preset threshold value.

As described in the first embodiment, the singular value of a channel matrix is proportional to the corresponding receiving power. In other words, each receiving power can be estimated from the corresponding singular value, and the modulation scheme suitable for the estimated receiving power can be selected. Thus, the modulation scheme can be determined from the singular value. Namely, when the singular value exceeds a certain threshold value, it can be determined necessary to utilize a high-order multi-level modulation scheme that is hard to put to practice. Thus, complex weight assignment control is performed only when necessary, thereby omitting useless processing.

As described above, in the fourth embodiment, only if the receiving power of a transmission signal is high and a high-order modulation scheme is needed, the difference in characteristics between spatial multiplex signals is reduced, whereby the load on a transmitting or receiving terminal can be reduced. Accordingly, no accurate apparatuses are needed. Even a standard apparatus can sufficiently utilize the channel responses by increasing the transmission rate of spatial multiplex signals as a whole, instead of increasing the transmission rate of a particular signal. Further, since no accurate apparatuses are necessary, the required chip area can be reduced. Moreover, when the receiving power is low and application of a high-order modulation scheme is not needed, no weight control is performed to omit unnecessary processing and hence to reduce the consumption of power.

Fifth Embodiment

FIG. 11 shows a configuration example of a radio communication apparatus according to a fifth embodiment. The radio communication apparatus according to a fourth embodiment is similar in configuration to that of FIG. 1, and also similar to the first to fourth embodiment in that different beams corresponding to subcarriers are used to multiplex signals for transmission. The fifth embodiment is similar to the fourth embodiment in that a weight, which provides high receiving power, is assigned to modulation signals output from different modulators and corresponding to subcarriers, only if the mean of singular values of each channel matrices exceeds a preset threshold value. The fifth embodiment differs from the fourth embodiment in that in the former, the threshold value is varied in accordance with the characteristics of each RF unit.

As shown in FIG. 11, in the fifth embodiment, an RF-unit-performance observation unit 1101 observes the characteristics of RF units 118 to 121, and changes, in accordance with the characteristics acquired by observation, the threshold value used when the weight control unit 127 assigns a weight, which provides high receiving power, to modulation signals output from different modulators and corresponding to subcarriers. A description will be given of control performed when the characteristics of a power amplifier included in each of the RF units 118 to 121 are changed.

Figure 12:
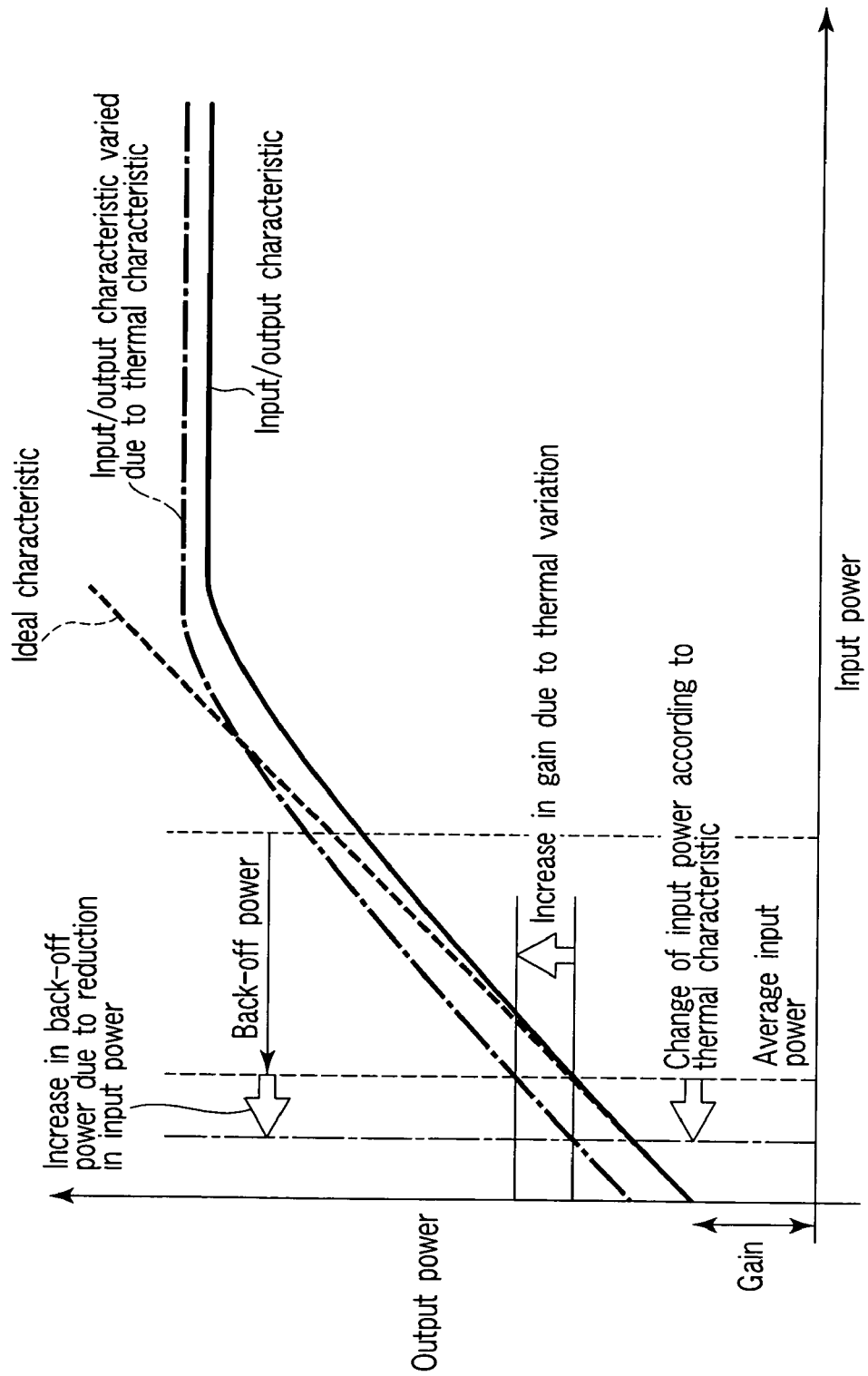
FIG. 12 is a view illustrating power characteristic examples of a power amplifier included in each RF unit appearing in FIG. 11.

FIG. 12 shows examples of power characteristics of the power amplifier. In FIG. 12, the horizontal axis indicates the input power, and the vertical axis indicates the output power. In power amplifiers, it is idealistic that the output power is proportional to the input power as indicated by the dashed line in FIG. 12. In general, however, the output power is saturated when the input power reaches a preset level, and an output power level more than a certain level cannot be acquired, as is indicated by the solid line in FIG. 12. When the output power has such a non-linear characteristic, the quality of communication is degraded. In general, the larger the multi-level modulation number of a signal, the greater the influence of non-linear distortion upon the signal, and the more conspicuous the degradation of quality of the signal.

To avoid such non-linear distortion, the average input power is set, in general, in order to operate the power amplifier in a region of a high linear characteristic, so that a signal of a power level lower than a level that causes distortion will be input. The difference between the average input power and power that causes distortion is called back-off power. In general, the greater the back-off power, the smaller the non-linear distortion, whereas the greater the back-off power, the lower the power efficiency. In light of this, it is not desirable to increase the back-off power more than necessary.

Note that the above-mentioned input/output characteristic will change in accordance with the temperature of the device. Depending upon the temperature, the input/output characteristic may change as indicated by the dashed and single-dotted line in FIG. 12, whereby the output power may increase. If such a phenomenon occurs, the actual transmission power may exceed that preset in the radio communication system. To avoid this, a correction process is performed generally, in which the level of power output from each of the RF units 118 to 121 is measured, and the average input power is reduced if the output power is high, and is increased to increase the output power if the output power is low. If it is determined that the output power is high as in FIG. 12, the average input power is reduced.

As a result, the back-off power is increased, and hence the region in which the power amplifier exhibits the linear characteristic is increased. In this case, even if high-order multi-level modulation is utilized, the influence of the linear distortion upon the power amplifier is reduced. Therefore, it is not necessary to assign a weight, which provides high receiving power, to modulation signals output from different modulators and corresponding to subcarriers, as in the first to third embodiments. Namely, the threshold value employed in the fourth embodiment can be increased to widen the region in which a weight that provides high receiving power is assigned only to modulation signals output from a particular modulator.

As described above, in the fifth embodiment, the threshold value employed in the fourth embodiment is varied in accordance with the characteristics of each of the RF units 118 to 121. Specifically, the RF-unit-performance observation unit 1101 measures the power level of the signals output from the RF units 118 to 121, and inputs, to the weight control unit 127, a signal for controlling the average power to be input to the power amplifiers of the RF units 118 to 121. Further, the weight control unit 127 increases the threshold value employed in the fourth embodiment if the average input power is low, and reduces it if the average input power is high.

As described above in detail, in the fifth embodiment, it is determined from the characteristics of each RF unit whether a high-order modulation scheme is applicable, and the high-order modulation scheme is applied only when it is applicable, thereby preventing degradation of communication quality, simplifying the process by the weight control unit, and reducing the consumption of power. In contrast, if the high-order modulation scheme is inapplicable to a transmission signal although the receiving power of the transmission signal is high, the difference in characteristics between spatial multiplex signals is reduced. Thus, reduction of the communication rate is minimized by increasing the transmission rate of the spatial multiplex signals as a whole, instead of increasing the transmission rate of only a particular signal.

Sixth Embodiment

A radio communication apparatus according to a Sixth embodiment is similar in configuration to that shown in FIG. 1, and also similar to the first to fifth embodiments in that weight vectors are determined from the channel responses, and signals are multiplexed for transmission using beams different between subcarriers. The former case is also the same as the latter cases in that singular vectors corresponding to the higher and lower singular values are assigned to modulation signals of different subcarriers. The sixth embodiment differs from the first to fifth embodiments in that in the former, the number of signals to be multiplexed (i.e., the number of data streams to which the information streams to be transmitted (see FIG. 2) is divided) is three or more, unlike the first to fifth embodiments.

When the number of signals to be multiplexed is increased, the number of coded signals in FIG. 1 is increased. Although FIG. 1 shows only two coded signals 1 and 2, code signals corresponding to the number of spatial multiplex signals are input. In this case, if the coded signals are generated by a plurality of coding units as shown in FIG. 2, the number of outputs of the signal distributor in FIG. 2 is increased in accordance with the number of spatial multiplex signals, and the number of coding units connected to the distributor is also increased. In contrast, where a plurality of coded signals are generated by a single coding unit as shown in FIG. 3, the number of outputs of the signal distributor shown in FIG. 3 is increased in accordance with the number of spatial multiplex signals.

Furthermore, in FIG. 1, the number of serial-to-parallel converters, which receive the coded signals, is also increased in accordance with the increase of the number of spatial multiplex signals, and the number of modulators connected to the respective serial-to-parallel converters is accordingly increased. In the weight matrix multiplier 105, modulation signals corresponding to subcarriers are each multiplied by the same number of weights as the inverse Fourier converters 106 to 109 are multiplied, and all spatial multiplex signals are accumulated (multiplexed) and output. The number of units connected after the weight matrix multiplier 105 is unchanged.

In this case, it is necessary for the radio communication apparatus and receiving terminal to incorporate a larger number of RF units than the number of spatial multiplex signals. Assuming that the number of RF units included in the radio communication apparatus is N, that of RF units included in the receiving terminal is M, and that of the spatial multiplex signals is L, the channel response matrix H(k) of the $k^{th}$ subcarrier is given by $$H^{(k)} = U^{(k)} D^{(k)} V^{(k)H} \quad (11)$$
$$= [u_1^{(k)}, u_2^{(k)}, \ldots, u_R^{(k)}] diag[\lambda_1, \lambda_2, \ldots, \lambda_R]$$
$$[v_1^{(k)}, v_2^{(k)}, \ldots, v_R^{(k)}]^H$$
$$= \lambda_1 u_1^{(k)} v_1^{(k)H} + \lambda_2 u_2^{(k)} v_2^{(k)H} + \ldots + \lambda_R u_R^{(k)} v_R^{(k)H}$$

where $$R = \min(M, N) \quad (12\text{-}1)$$
$$L \leq R \quad (12\text{-}2)$$

If the number of spatial multiplex signals is smaller than R, L singular vectors corresponding to the highest L singular values are used as weight vectors.

Also when the number of spatial multiplex signals is three or more, singular vectors corresponding to higher and lower singular values are assigned as weight vectors to modulation signals as in the first and second embodiments.

Figure 13:
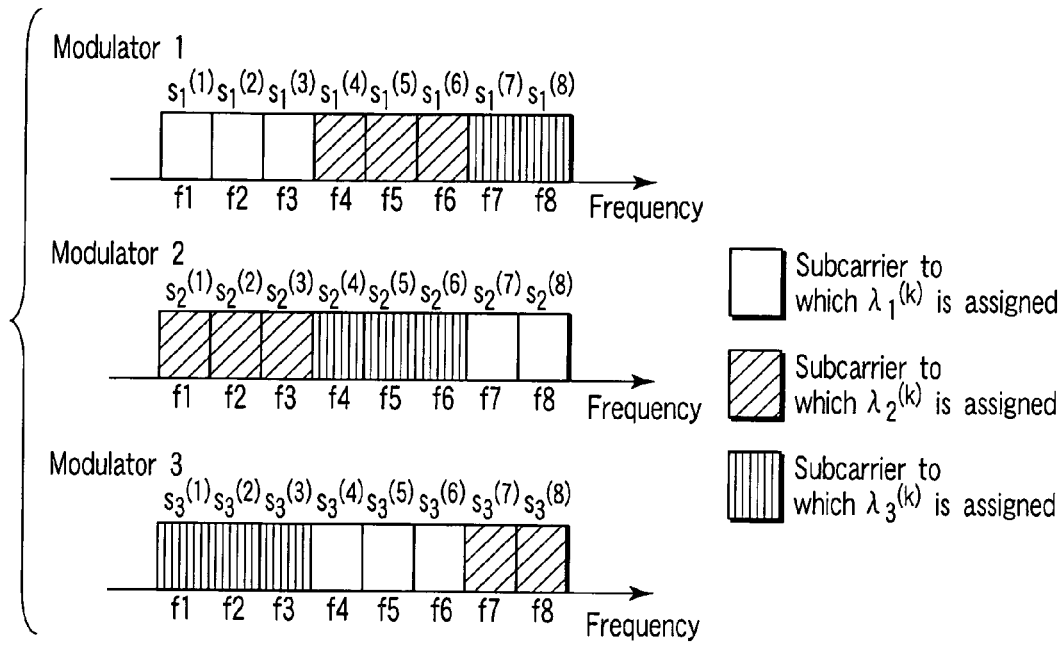
FIG. 13 is a view illustrating an assignment example of weight vectors in a sixth embodiment.

Referring to FIG. 13, a description will be given of the assignment of singular vectors performed when the number of spatial multiplex signals is three. In the example of FIG. 13, the number of subcarriers is eight. Further, concerning modulation signals acquired by modulation by a modulator 103, singular vectors corresponding to the highest singular value are assigned to subcarriers $f_1$, $f_2$ and $f_3$, singular vectors the second highest singular value are assigned to subcarriers $f_4$, $f_5$ and $f_6$, and singular vectors corresponding to the lowest singular value are assigned to subcarriers $f_7$ and $f_8$. Similarly, concerning modulation signals acquired by modulation by modulators 2 and 3, weight vectors are assigned as shown in FIG. 13.

Figure 14:
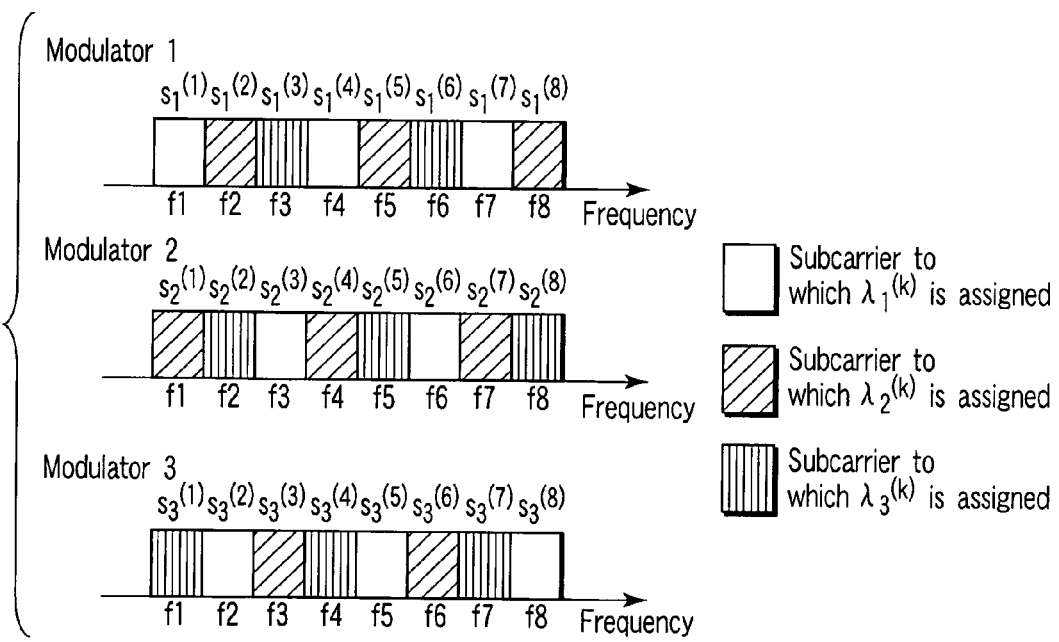
FIG. 14 is a view illustrating another assignment example of weight vectors in the sixth embodiment.

Thus, also when the number of spatial multiplex signals is three, the difference in characteristics between the signals can be reduced as in the first embodiment. Further, the same advantage as the second embodiment can be acquired by assigning weight vectors as shown in FIG. 14.

Although the above concerns the case where the number of spatial multiplex signals is three, the same can be said of the case where the number of spatial multiplex signals is four. Furthermore, although the number of subcarriers is set to eight in the fifth embodiment, it is not limited to eight, which is similar to the first to fifth embodiments.

As described above, even when the number of spatial multiplex signals is three or more, the difference in characteristics between the signals can be reduced, thereby reducing the load of the RF units. At this time, if the signal bandwidth is divided into groups corresponding to the number of spatial multiplex signals, and control is performed in units of groups, the correlation in channel response between adjacent subcarriers increases, which enables a receiving terminal to perform an averaging process concerning the frequency when estimating the channel responses. As a result, the estimation accuracy concerning the channel matrices is enhanced. Further, if a weight that provides high receiving power is assigned, in units of several subcarriers, to modulation signals output from different modulators, thereby making the modulation signals more uniform in receiving characteristics. Furthermore, if the whole width of several subcarriers, in units of which the weight is switched from one to another, is made equal to the whole width of several subcarriers, in units of which the components of a coded signal are assigned by an interleaver, the coded signal can alternately exhibit high and low receiving power levels. Namely, the coded signal is prevented from continuously exhibiting low receiving power, with the result that degradation of decoding performance can be avoided. If weight assignment control is performed only when the singular value of each channel matrix exceeds a preset threshold value, unnecessary control can be avoided, which reduces the consumption of power. In addition, if the threshold value is varied in accordance with the performance of each RF unit, control suitable for each RF unit can be realized.

Seventh Embodiment

A radio communication apparatus according to a seventh embodiment is similar in configuration to that of the sixth embodiment, and also similar to the sixth embodiment in that weight vectors are determined from the channel responses, and three or more signals are multiplexed for transmission using beams different between subcarriers. The seventh embodiment differs from the sixth embodiment in the way of assignment of weight vectors.

Figure 15:
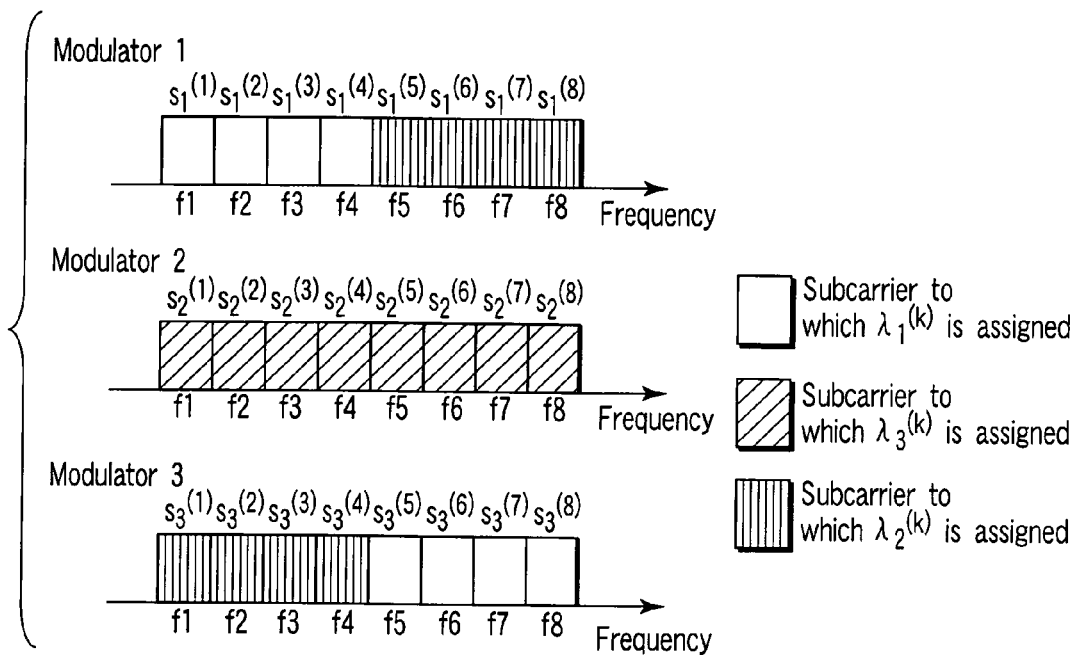
FIG. 15 is a view illustrating an assignment example of weight vectors in a seventh embodiment.

Referring to FIG. 15, the way of assignment of weight vectors employed in the seventh embodiment will be described using the case where the number of spatial multiplex signals is three.

In the example of FIG. 15, assume that singular values $\lambda_1^{(k)}$, $\lambda_2^{(k)}$ and $\lambda_3^{(k)}$ corresponding to the channel responses of the $k^{th}$ subcarriers of the three spatial multiplex signals satisfy the following relationship:

$$\lambda_1^{(k)} \geq \lambda_3^{(k)} \geq \lambda_2^{(k)} \quad (13)$$

When singular values $\lambda_i^{(k)}$ (i=1, 2, 3) satisfy the relationship given by the expression (13), a singular vector corresponding to the maximum singular value $\lambda_1^{(k)}$ and a singular vector corresponding to the minimum singular value $\lambda_2^{(k)}$ are assigned to different subcarriers of each of the signals, modulated by modulators 1 and 3, as shown in FIG. 15. It is expected that this assignment enables the signal modulated by a modulator 2, to all subcarriers of which a singular vector corresponding to the second highest singular value is assigned, to have substantially the same power as the signal modulated by the modulator 1 or 3.

Thus, the signals modulated by different modulators can be controlled to have substantially the same receiving power simply by uniformly assigning, to the signals modulated by some of the modulators, singular vectors corresponding to particular singular values, instead of uniformly assigning, to all signals modulated by all modulators, singular vectors corresponding to all singular values.

Figure 16:
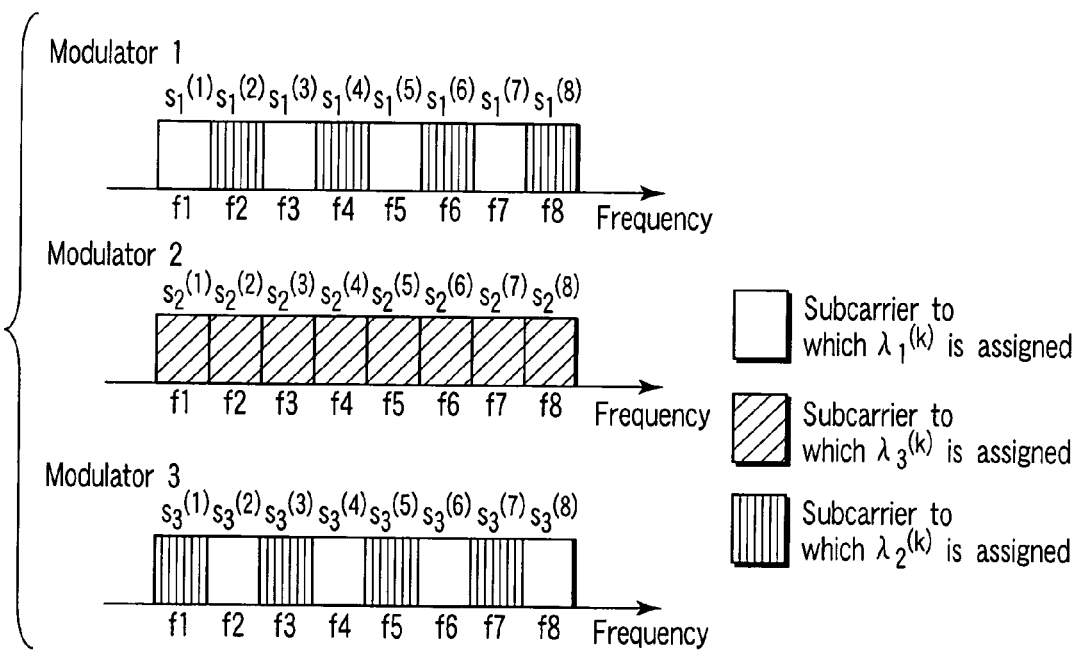
FIG. 16 is a view illustrating another assignment example of weight vectors in the seventh embodiment.

Further, as shown in FIG. 16, the same advantage as acquired by the second embodiment can be acquired by assigning weights to the modulators so that the singular vector corresponding to the maximum singular value is assigned to every second subcarrier.

Figure 17:
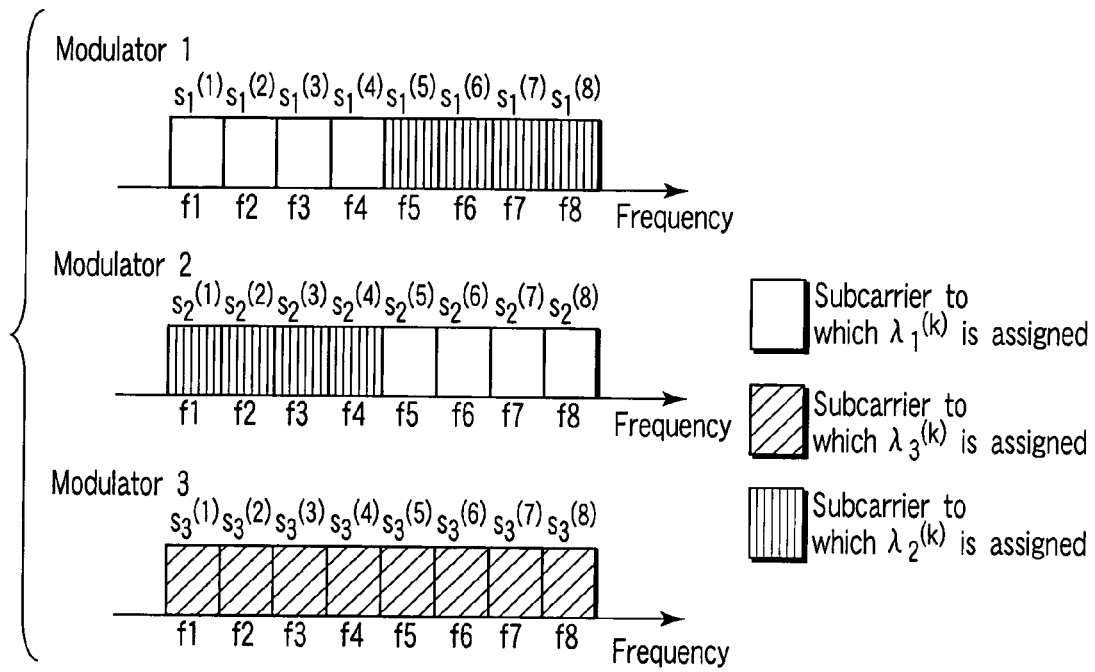
FIG. 17 is a view illustrating yet another assignment example of weight vectors in the seventh embodiment.
Figure 18:
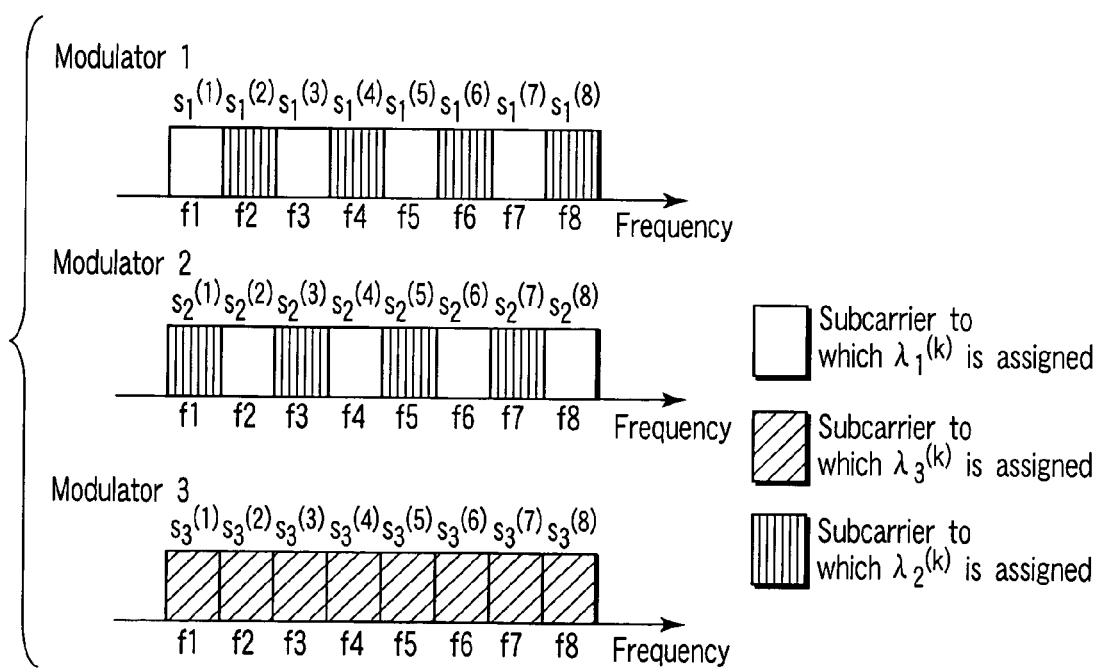
FIG. 18 is a view illustrating a further assignment example of weight vectors in the seventh embodiment.

Furthermore, in the cases of FIGS. 15 and 16, the singular vector corresponding to the second highest singular value $\lambda_3^{(k)}$ is assigned to all subcarriers of the signal modulated by the modulator 2, while the way of assignment of weights is switched between the signals modulated by the modulators 1 and 3. However, the same advantage can be acquired even from the case shown in FIG. 17 or 18, where the singular vectors corresponding to the highest and minimum singular values $\lambda_1^{(k)}$ and $\lambda_2^{(k)}$ are assigned to the subcarriers of each of the signals modulated by the modulators 1 and 2.

Further, if the whole width of several subcarriers, in units of which the weight corresponding to the maximum singular value is switched from one to another, is made equal to that of several subcarriers, in units of which the components of a signal output from each coding unit are distributed, the seventh embodiment can provide the same advantage as the third embodiment.

In addition, when the singular vector corresponding to the maximum singular value is assigned, in units of subcarriers, to modulation signals output from different modulators only if the corresponding singular values exceed a preset threshold value, the operation of controlling the weight can be stopped when weight assignment is not necessary. As a result, the consumption of power can be reduced as in the fourth embodiment. Also, if the threshold value is changed in accordance with the state of each RF unit, control can be performed in accordance with the state of each RF unit, thereby providing the same advantage as the fifth embodiment.

As described above, in the seventh embodiment, the difference in receiving performance between spatial multiplex signals can be minimized, thereby reducing the load on the RF units. In addition, since the difference in receiving characteristics between the modulation signals of all modulators can be reduced without performing weight assignment on all modulation signals output from all modulators, the control can be simplified. At this time, if the signal bandwidth is divided into groups corresponding to the number of spatial multiplex signals, and control is performed in units of groups, the correlation in channel response between adjacent subcarriers increases, which enables a receiving terminal to perform an averaging process concerning the frequency when estimating the channel responses. As a result, the estimation accuracy concerning the channel matrices is enhanced. Further, if a weight that provides high receiving power is assigned, in units of several subcarriers, to modulation signals output from different modulators, thereby making the modulation signals more uniform in receiving characteristics. Furthermore, if the whole width of several subcarriers, in units of which the weight is switched from one to another, is made equal to the whole width of several subcarriers, in units of which the components of a coded signal are assigned by an interleaver, the coded signal components can alternately exhibit high and low receiving power levels. Namely, the coded signal is prevented from continuously exhibiting low receiving power, with the result that degradation of the decoding performance can be avoided. If weight assignment control is performed only when the mean of singular values of each channel matrices exceeds a preset threshold value, unnecessary control can be avoided, which reduces the consumption of power. In addition, if the threshold value is varied in accordance with the performance of each RF unit, control suitable for each RF unit can be realized.

Eighth Embodiment

A radio communication apparatus according to an eighth embodiment is similar in configuration to that of the seventh embodiment, and also similar to the seventh embodiment in that weight vectors are determined from the channel responses, and three or more signals are multiplexed for transmission using beams different between subcarriers. The eighth embodiment is further similar to the seventh embodiment in that complicated weight distribution is performed on only part of spatial multiplex signals. The eighth embodiment differs from the seventh embodiment in that in the former, weight vectors are assigned not to uniform all spatial multiplex signals in channel response, but to reduce the difference in characteristics between only several of the spatial multiplex signals.

Figure 19:
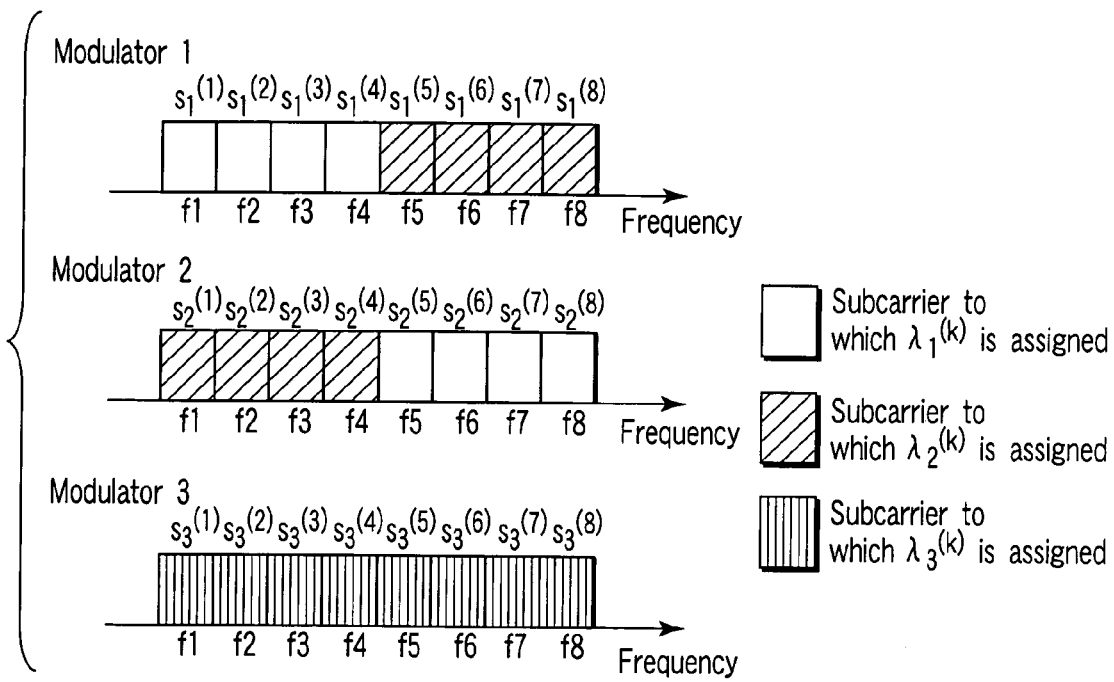
FIG. 19 is a view illustrating an assignment example of weight vectors in an eighth embodiment.

FIG. 19 shows an assignment example of weight vectors in the eighth embodiment, using, as an example, the case where the number of spatial multiplex signals is three.

In the sixth embodiment, assignment of weight vectors to subcarriers is controlled so as to assign a singular vector corresponding to the maximum singular value to signals modulated by all modulators. In the seventh embodiment, singular vectors corresponding to the highest and lowest (third highest) singular values are assigned to different subcarriers in a single modulator, thereby making uniform the receiving power levels of all spatial multiplex signals.

However, when the correlation in channel response between antennas is high, the difference between the highest and lowest singular values is large. Accordingly, if singular vectors corresponding to the highest and lowest singular values are assigned to different subcarriers of the signal modulated by a single modulator as in the sixth or seventh embodiment, the difference in receiving power between the subcarriers are not small. This leads to degradation of characteristics when a common modulation scheme must be assigned to all subcarriers. In particular, if the coding rate is high, the degradation becomes conspicuous.

In light of the above, when the singular values $\lambda_1^{(k)}$, $\lambda_2^{(k)}$ and $\lambda_3^{(k)}$ corresponding to the channel responses of the $k^{th}$ subcarriers of the three spatial multiplex signals satisfy the following relationship, such weight assignment as shown in FIG. 19 is performed:

$$\lambda_1^{(k)} \geq \lambda_2^{(k)} \geq \lambda_3^{(k)} \tag{14}$$

As a result, the signals modulated by the modulators 1 and 2 can have substantially the same receiving characteristics as in the first embodiment. Further, since in the eighth embodiment, only the singular vectors corresponding to the highest and second highest singular values are assigned to the signals modulated by the modulators 1 and 2, the power difference between the subcarriers of the signals modulated by the modulators 1 and 2 are small, unlike the sixth and seventh embodiments. Further, since only the singular vector corresponding to the third highest (i.e., lowest) singular value is assigned to all subcarriers of the signal modulated by the modulator 3, the power difference between subcarriers is similar to that in the conventional scheme, i.e., no degradation occurs compared to the conventional scheme.

As described above, in the eighth embodiment, the difference in characteristics between spatial multiplex signals can be reduced, thereby reducing the loads of the RF units. Moreover, when the channels of the antennas have high correlation or the coding rate is high, the power difference between the subcarriers of the signals is reduced, with the result that degradation of characteristics can be prevented.

Figure 20:
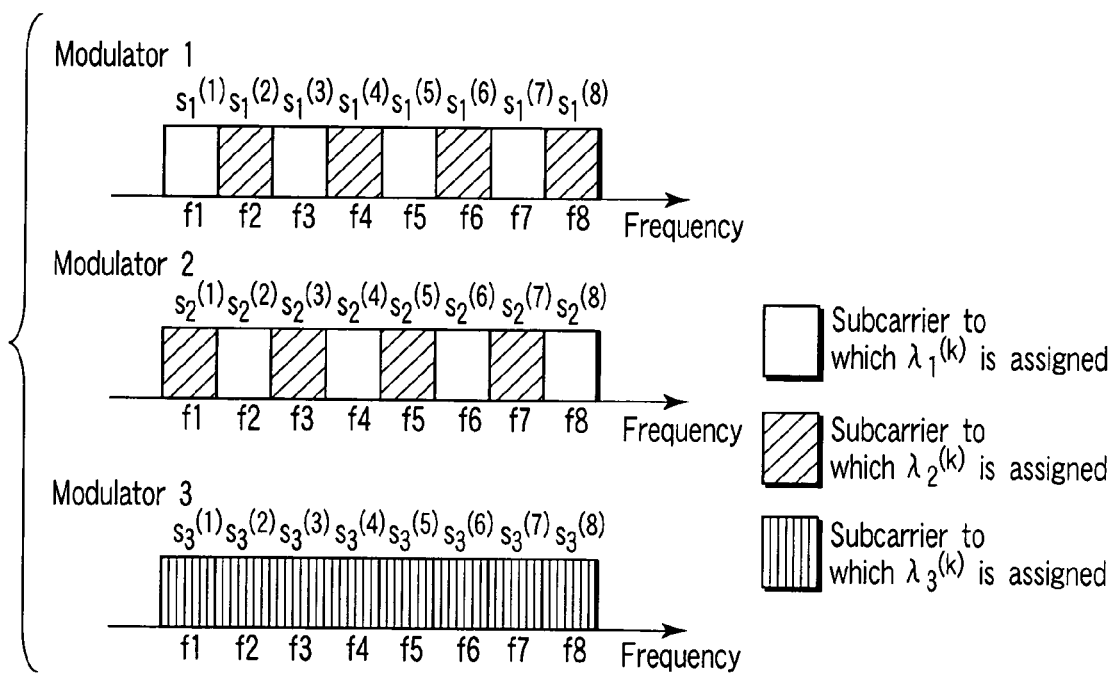
FIG. 20 is a view illustrating another assignment example of weight vectors in the eighth embodiment.

Further, if two weights are alternately assigned to the adjacent subcarriers of each signal, modulated by the modulators 1 and 2, as shown in FIG. 20, the same advantage as acquired by the second embodiment can also be acquired.

Furthermore, if the whole width of several subcarriers, in units of which the weight assigned to the maximum singular value is switched from one to another, is made equal to that of several subcarriers, in units of which the components of a signal output from each coding unit are distributed, the seventh embodiment can provide the same advantage as the third embodiment.

In addition, when the singular vector corresponding to the maximum singular value is assigned, in units of subcarriers, to modulation signals output from different modulators only if the corresponding singular values exceed a preset threshold value, the operation of controlling the weight can be stopped when weight assignment is not necessary. As a result, the consumption of power can be reduced as in the fourth embodiment. Also, if the threshold value is changed in accordance with the state of each RF unit, control can be performed in accordance with the state of each RF unit, thereby providing the same advantage as the fifth embodiment.

Ninth Embodiment

A radio communication apparatus according to a ninth embodiment is similar in configuration to those of the sixth to eighth embodiments, and also similar to those of the sixth to eighth embodiments in that weight vectors are determined from the channel responses, and three or more signals are multiplexed for transmission using beams different between subcarriers. The ninth embodiment differs from the seventh embodiment in that in the former, it is selected, in accordance with the singular value of each channel response, whether weight assignment should be performed to make all spatial multiplex signals have substantially the same characteristics, or whether weight assignment should be performed to reduce the difference in characteristics between only some of spatial multiplex signals.

As described in the eighth embodiment, when the difference between the highest singular value and the third highest singular value is large, the performance of decoding may be degraded. However, if the channel matrix is substantially an orthogonal one, the difference between the highest singular value and the third highest singular value is not large, and the problem does not occur. In this case, the weight assignment employed in the sixth or seventh embodiment provides superior characteristics to those acquired in the eighth embodiment, since in the former, power is more unlikely to concentrate on a particular signal.

Accordingly, in the ninth embodiment, the ratio of the third highest singular value to the highest singular value is computed. Further, if the computed ratio is not less than a preset threshold value, the weights corresponding to the highest singular value and third highest singular value are prevented from being assigned to the modulation signals output from a particular modulator, which is similar to the eighth embodiment. In contrast, if the computed ratio is less than the preset threshold value, the weights corresponding to the highest singular value and third highest singular value are assigned to the modulation signals, which is similar to the sixth or seventh embodiment.

In the above control process, when the difference between the highest singular value and third highest singular value is large, the weight corresponding to the second highest singular value higher than the third highest singular value is assigned to the modulation signals output from the modulators 1 and 2. Therefore, the difference in receiving power between the subcarriers of the modulation signals output from the modulator 1 or 2 is smaller than that in the sixth or seventh embodiment, thereby preventing degradation of the decoding performance. In contrast, when the difference between the highest singular value and third highest singular value is small, the weights corresponding to the highest singular value and third highest singular value are assigned to the modulation signals output from the modulators 1 and 2. As a result, the difference in receiving power between the modulation signals output from the modulators is made smaller than in the eighth embodiment.

As described above, in the ninth embodiment, the difference in characteristics between spatial multiplex signals can be reduced to thereby reduce the load on each RF unit. Furthermore, since the way of control of weights is changed in accordance with the difference between the highest singular value and the third highest singular value, the power difference between subcarriers can be reduced to thereby prevent degradation of the decoding performance.

If two weights are alternately assigned to the subcarriers corresponding to the modulation signals output from each modulator, as shown in FIG. 20, the same advantage as the second embodiment can be acquired.

In addition, if the whole width of several subcarriers, in units of which the weight is switched from one to another, is made equal to the whole width of several subcarriers, in units of which the components of a coded signal are assigned by an interleaver, the same advantage as the third embodiment can be acquired.

Further, if the singular vector corresponding to the highest singular value is assigned to modulation signals output from different modulators only if the mean of singular values of each channel matrices exceeds a preset threshold value, unnecessary weight assignment control can be avoided, which reduces the consumption of power as in the fourth embodiment. In addition, if the threshold value is varied in accordance with the state of each RF unit, control suitable for each RF unit can be realized, as in the fifth embodiment.

Tenth Embodiment

A tenth embodiment is similar to the first to fifth embodiments in the configuration of the apparatus and in that a singular vector corresponding to a higher singular value is assigned, in units of several subcarriers, to modulation signals output from different modulators, so that the spatial multiplex signals will have substantially the same characteristics. The tenth embodiment differs from the first to ninth embodiments in that in the former, the transmission signals are transmitted with different transmission power levels.

As shown in the expressions (10), even if the transmission signals are transmitted with the same transmission power, the receiving power levels of the signals at the receiving terminal differ. It is known that higher channel capacity can be acquired in the case where greater transmission power is imparted to signals of higher channel responses, than in the case where equal power is imparted to all signals. When total transmission power is constant, an optimal transmission power level to be assigned to each transmission signal is theoretically detected as given by $$\gamma_i = \mu - \frac{N_0}{E_s \cdot \lambda_i} \quad (15)$$

where γi is transmission power assigned to a signal to be transmitted with a weight of a singular vector corresponding to the $i^{th}$ highest singular value $\lambda_i$, $N_0$ is the noise/power density of a receiving terminal, $E_s$ is the mean power of modulation signals. Further, μ is a constant set to make the total transmission power constant. From the equation (15), it is understood that the higher the singular value, the higher the transmission power.

Figure 21:
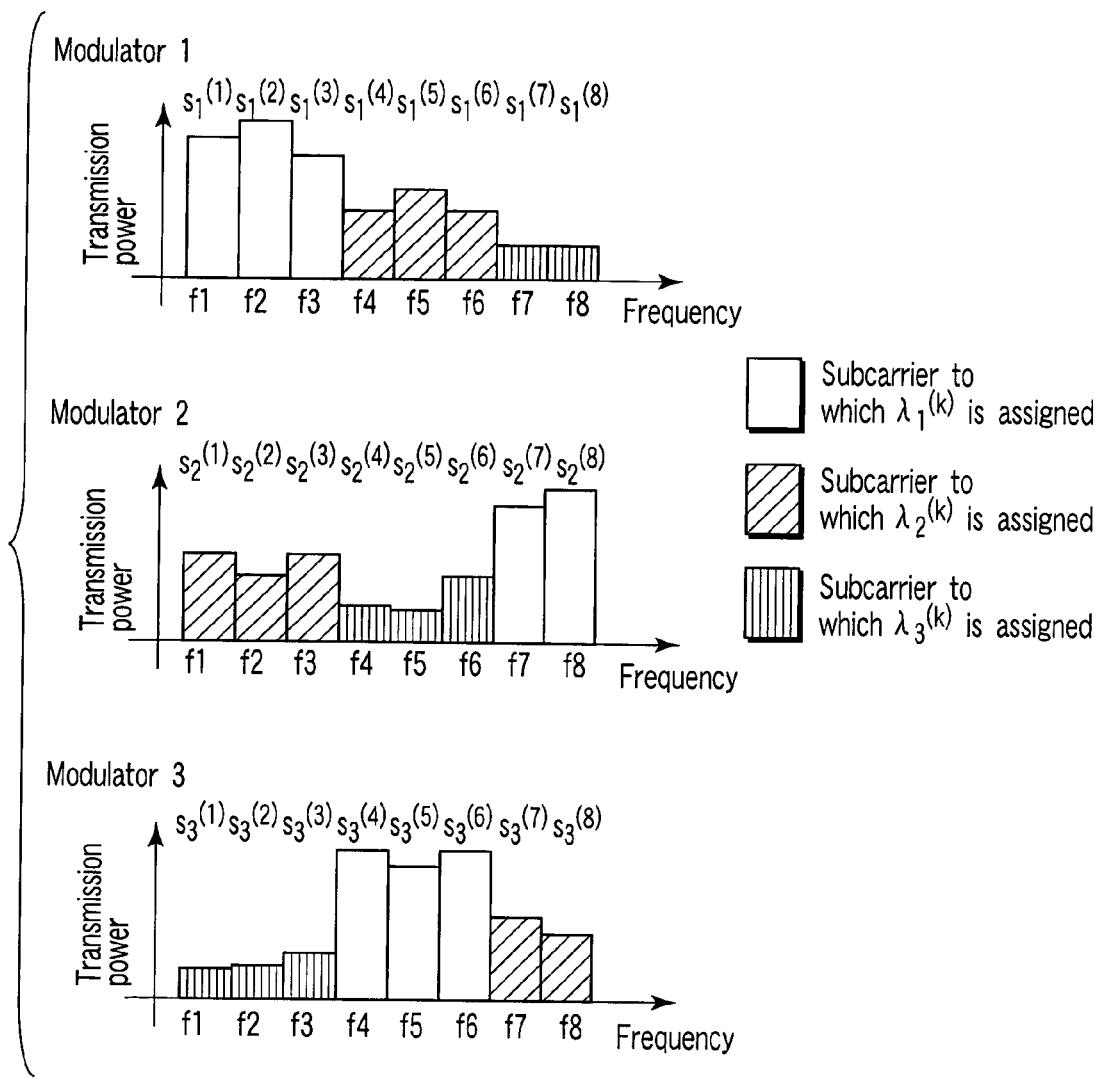
FIG. 21 is a view illustrating an assignment example of weight vectors and an assignment example of transmission power in a tenth embodiment.

Referring to FIG. 21, a description will be given of the case where different transmission power levels are assigned to transmission signals. As shown in FIG. 21, in the tenth embodiment, singular vectors corresponding to different singular values are assigned to signals of different subcarriers, as in the first to ninth embodiments. In the prior art, the difference in characteristics between spatial multiplex signals is increased by transmission power control, whereas in the sixth embodiment, channel capacity can be increased by transmission power control, and the difference in characteristics between spatial multiplex signals can be reduced. Although the example of FIG. 21 is only related to the way of weight vector assignment shown in FIG. 13, similar transmission signal power control may be employed in the cases of FIGS. 7 to 10 and 13 to 20.

As described above, in the tenth embodiment, transmission power control is performed to maximize the channel capacity, with the result that the difference in characteristics between spatial multiplex signals can be minimized without reducing the channel capacity.

Eleventh Embodiment

A radio communication apparatus according to a seventh embodiment is similar in configuration to that of the first embodiment shown in FIG. 1, and also similar to the first to tenth embodiments in that different beams corresponding to subcarriers are used to multiplex signals for transmission. The eleventh embodiment differs from the first to tenth embodiments in the way of determining weight vectors from channel responses.

In the first to tenth embodiments, singular value decomposition is performed on channel responses, and singular vectors or scalar products of singular vectors (tenth embodiment) are used as weight vectors. However, the weight vectors used in the embodiments of the present invention are not limited to them. For instance, transposed complex conjugate vectors of the row vectors of the channel matrix $H^{(k)}$ may be used as weight vectors.

Assume here that the channel matrix is given by the following equation:

$$H^{(k)} = \begin{bmatrix} h_{11}^{(k)} & h_{12}^{(k)} & h_{13}^{(k)} & h_{14}^{(k)} \\ h_{21}^{(k)} & h_{22}^{(k)} & h_{23}^{(k)} & h_{24}^{(k)} \end{bmatrix} \quad (16)$$

$$= \begin{bmatrix} h_1^{(k)T} \\ h_2^{(k)T} \end{bmatrix}$$

where $h_1^{(k)}$ and $h_2^{(k)}$ satisfy the following:

$$h_1^{(k)} = [\, h_{11}^{(k)} \quad h_{12}^{(k)} \quad h_{13}^{(k)} \quad h_{14}^{(k)} \,]^T \quad (17\text{-}1)$$

$$h_2^{(k)} = [\, h_{21}^{(k)} \quad h_{22}^{(k)} \quad h_{23}^{(k)} \quad h_{24}^{(k)} \,]^T \quad (17\text{-}2)$$

In the above equations, the number of RF units incorporated in the radio communication apparatus is set to four, and the number of RF units incorporated in the receiving terminal is set to two. However, in the embodiment, the numbers are not limited to them, and can be set to any arbitrary values.

In this case, weight vectors given by the following are used:

$$h_1^{(k)*}/\|h_1^{(k)}\| \text{ and } h_2^{(k)*}/\|h_2^{(k)}\| \quad (18)$$

If these weight vectors are used, signals synchronized in phase can be transmitted to the receiving terminal. The receiving power acquired by the receiving terminal when the weight vectors are used can be estimated from the vector norm.

If the following expression (19) is satisfied, a higher receiving power can be acquired by the receiving terminal in the case of the following expression (20), than in the case of the following expression (21):

$$\|h_1^{(k)}\| > \|h_2^{(k)}\| \quad (19)$$

$$h_1^{(k)*}/\|h_1^{(k)}\| \quad (20)$$

$$h_2^{(k)*}/\|h_2^{(k)}\| \quad (21)$$

Accordingly, when a weight vector is assigned to the $k^{th}$ subcarrier so that the modulation signal $s_1^{(k)}$ can be received with a high receiving power, the following equations (22-1) and (22-2) are satisfied:

$$w_1^{(k)} = h_1^{(k)*}/\|h_1^{(k)}\| \quad (22\text{-}1)$$

$$w_2^{(k)} = h_2^{(k)*}/\|h_2^{(k)}\| \quad (22\text{-}2)$$

On the other hand, when a weight vector is assigned to the $k^{th}$ subcarrier so that the modulation signal $s_2^{(k)}$ can be received with a high receiving power, the following equations (23-1) and (23-2) are satisfied:

$$w_1^{(k)} = h_2^{(k)*}/\|h_2^{(k)}\| \quad (23\text{-}1)$$

$$w_2^{(k)} = h_1^{(k)*}/\|h_1^{(k)}\| \quad (23\text{-}2)$$

Although in the equations (22-1), (22-2), (23-1) and (23-2), signals corresponding to the weight vectors have the same transmission power level, they may have different transmission power levels as in the tenth embodiment.

As described above, even if SVD is not performed, the eleventh embodiment can provide the same advantage as the first to tenth embodiments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communication apparatus for transmitting data to a receiving apparatus, comprising:
   a division unit configured to divide the transmit data into a first stream and a second stream;
   a serial-to-parallel conversion unit configured to subject the first stream and the second stream to serial-to-parallel conversion to obtain a plurality of data signals;
   a modulation unit configured to modulate the data signals into a plurality of OFDM modulation signals corresponding to the first stream and the second stream using a plurality of subcarriers;
   an acquisition unit configured to acquire a plurality of channel responses between the radio communication apparatus and the receiving apparatus;
   a computation unit configured to compute singular values $\lambda_1^{(k)}$ and $\lambda_2^{(k)}$ of a channel matrix corresponding to a $k^{th}$ (k is a natural number) subcarrier included in the subcarriers, based on the acquired channel responses;
   a weight assignment unit configured to assign a plurality of weights corresponding to the singular values $\lambda_1^{(k)}$ and $\lambda_2^{(k)}$ to the first stream and the second stream where a correspondence of each weight to each stream is different by subcarrier;
   a multiplication unit configured to multiply, by each of the assigned weights, the OFDM modulation signals corresponding to each of the first stream and the second stream, and acquire first signals and second signals corresponding to the first stream and the second stream;
   an addition unit configured to add the first signals and the second signals, and acquire added signals;
   an inverse Fourier transform unit configured to subject the added signals to inverse Fourier transform; and
   a transmission unit configured to transmit, to the receiving apparatus, signals output from the inverse Fourier transform unit.

2. The apparatus according to claim 1, wherein the transmit data is divided into the first stream and the second stream before being coded by one of Reed-Solomon coding, convolution coding and low-density parity check (LDPC) coding.

3. The apparatus according to claim 1, wherein the weight assignment unit alternately assigns, to the subcarriers, the weights corresponding to the singular values $\lambda_1^{(k)}$ and $\lambda_2^{(k)}$.

4. The apparatus according to claim 1, wherein the weight assignment unit alternately assigns the weights corresponding to the singular values $\lambda_1^{(k)}$ and $\lambda_2^{(k)}$ to groups of the subcarriers, the groups each including two or more of the subcarriers.

5. The apparatus according to claim 1, wherein if the radio communication apparatus imparts different levels of transmission power to the subcarriers, the weight assignment unit assigns the weights corresponding to the singular values $\lambda_1^{(k)}$ and $\lambda_2^{(k)}$ to the streams in accordance with the different levels of transmission power.

6. The apparatus according to claim 1, wherein the weight assignment unit continuously assigns a plurality of vectors corresponding to the singular value $\lambda_1^{(k)}$ to a spatial multiplex signal for certain subcarriers, and number of the subcarriers is equal to a width by which contiguous signals are assigned before an interleaver permute it.

7. The apparatus according to claim 1, wherein if a mean of the singular value $\lambda_1^{(k)}$ is greater than a threshold value, the weight assignment unit assigns the weights corresponding to the singular values $\lambda_1^{(k)}$ and $\lambda_2^{(k)}$ to the first stream and the second stream where a correspondence of each weight to each stream is different by subcarrier.

8. The apparatus according to claim 7, wherein the transmission unit includes:
   a plurality of RF units containing respective power amplifiers;
   a measurement unit configured to measure a plurality of powers of signals output from the RF units; and
   an controller unit configured to decide a first average power of a signal input to each of the power amplifiers, based on the measured powers,
   wherein each of the RF units setting, to the decided first average power, a second average power of the signal input to the each power amplifier,
   the weight assignment unit varying the threshold value based on the set average power.

9. A radio communication apparatus for transmitting data to a receiving apparatus, comprising:
   a division unit configured to divide the transmit data into at least three streams;
   a serial-to-parallel conversion unit configured to subject the streams to serial-to-parallel conversion to obtain a plurality of data signals;
   a modulation unit configured to modulate the data signals into a plurality of OFDM modulation signals corresponding to the at least three streams using a plurality of subcarriers;
   an acquisition unit configured to acquire a plurality of channel responses between the radio communication apparatus and the receiving apparatus;
   a computation unit configured to compute singular values $\lambda_1^{(k)}, \lambda_2^{(k)}, \ldots, \lambda_m^{(k)}$ (m is a natural number not less than 3) of a channel matrix corresponding to a $k^{th}$ (k is a natural number) subcarrier included in the subcarriers, based on the acquired channel responses;
   a weight assignment unit configured to assign a plurality of weights corresponding to the singular values $\lambda_1^{(k)}, \lambda_2^{(k)}, \ldots, \lambda_m^{(k)}$; to the streams where a correspondence of each weight to each stream is different by subcarrier, if $\lambda_1^{(k)} \geq \lambda_2^{(k)} \geq \ldots \geq \lambda_m^{(k)}$;
   a multiplication unit configured to multiply, by each of the assigned weights, the OFDM modulation signals corresponding to each of the streams and acquire m signals;
   an addition unit configured to add the m signals, and acquire added signals;
   an inverse Fourier transform unit configured to subject the added signals to inverse Fourier transform; and
   a transmission unit configured to transmit, to the receiving apparatus, signals output from the inverse Fourier transform unit.

10. The apparatus according to claim 9, wherein:
   the computation unit computes singular values $\lambda_1^{(k)}, \lambda_2^{(k)}$, and $\lambda_3^{(k)}$ of the channel matrix corresponding to the $k^{th}$ subcarrier, based on the acquired channel responses; and
   the weight assignment unit assigns weights corresponding to the singular values $\lambda_1^{(k)}$ and $\lambda_2^{(k)}$ to subcarriers of those of the OFDM modulation signals corresponding to two of the streams, if $\lambda_1^{(k)} \geq \lambda_3^{(k)} \geq \lambda_2^{(k)}$.

11. The apparatus according to claim 9, wherein the computation unit computes singular values $\lambda_1^{(k)}, \lambda_2^{(k)}$, and $\lambda_3^{(k)}$ of the channel matrix corresponding to the $k^{th}$ subcarrier, based on the acquired channel responses; and the weight assignment unit assigns a plurality of weights corresponding to the singular values $\lambda_1^{(k)}$ and $\lambda_2^{(k)}$ to the OFDM modulation signals corresponding to two of the streams where a correspondence of each weight to each stream is different by subcarrier, if $\lambda_1^{(k)} \geq \lambda_2^{(k)} \geq \lambda_3^{(k)}$ and a ratio of a mean of $\lambda_1^{(k)}$ to a mean of $\lambda_3^{(k)}$ is not less than a preset threshold value, the weight assignment unit assigns a plurality of weights corresponding to the singular values $\lambda_1^{(k)}, \lambda_2^{(k)}$ and $\lambda_3^{(k)}$ to the OFDM modulation signals corresponding to the streams where a correspondence of each weight to each stream is different by subcarrier, if $\lambda_1^{(k)} \geq \lambda_2^{(k)} \geq \lambda_3^{(k)}$ and the ratio of a mean of $\lambda_1^{(k)}$ to a mean of $\lambda_3^{(k)}$ is less than the preset threshold value.

12. The apparatus according to claim 9, wherein the computation unit computes singular values $\lambda_1^{(k)}, \lambda_2^{(k)}$, and $\lambda_3^{(k)}$ of the channel matrix corresponding to the $k^{th}$ subcarrier, based on the acquired channel responses; and the weight assignment unit assigns a plurality of weights corresponding to the singular values $\lambda_1^{(k)}$ and $\lambda_2^{(k)}$ to the OFDM modulation signals corresponding to two of the streams where a correspondence of each weight to each stream is different by subcarrier, if $\lambda_1^{(k)} \geq \lambda_2^{(k)} \geq \lambda_3^{(k)}$ and a ratio of a mean of $\lambda_1^{(k)}$ to a mean of $\lambda_3^{(k)}$ is not less than a preset threshold value, the weight assignment unit assigns a plurality of weights corresponding to the singular values $\lambda_1^{(k)}$ and $\lambda_3^{(k)}$ to the OFDM modulation signals corresponding to two of the streams where a correspondence of each weight to each stream is different by subcarrier, if $\lambda_1^{(k)} \geq \lambda_2^{(k)} \geq \lambda_3^{(k)}$ and the ratio of a mean of $\lambda_1^{(k)}$ to a mean $\lambda_3^{(k)}$ is less than the preset threshold value.

13. The apparatus according to claim 9, wherein the weight assignment unit alternately assigns the weights corresponding to the singular values $\lambda_1^{(k)}, \lambda_2^{(k)}, \ldots, \lambda_m^{(k)}$.

14. The apparatus according to claim 9, wherein the weight assignment unit alternately assigns the weights corresponding to the singular values $\lambda_1^{(k)}, \lambda_2^{(k)}, \ldots, \lambda_m^{(k)}$ to groups of the subcarriers, the groups each including two or more of the subcarriers.

15. A radio communication apparatus for transmitting data to a receiving apparatus, comprising:

a division unit configured to divide the transmit data into at least three streams;

a serial-to-parallel conversion unit configured to subject the streams to serial-to-parallel conversion to obtain a plurality of data signals;

a modulation unit configured to modulate the data signals into a plurality of OFDM modulation signals corresponding to the at least three streams using a plurality of subcarriers;

an acquisition unit configured to acquire a plurality of channel responses between the radio communication apparatus and the receiving apparatus;

a computation unit configured to compute singular values $\lambda_1^{(k)}$ and $\lambda_2^{(k)}$ of a channel matrix corresponding to a $k^{th}$ (k is a natural number) subcarrier included in the subcarriers, based on the acquired channel responses;

a weight assignment unit configured to assign a plurality of weights corresponding to the singular values $\lambda_1^{(k)}$ and $\lambda_2^{(k)}$ to the OFDM modulation signals corresponding to two of the streams where a correspondence of each weight to each stream is different by subcarrier, if $\lambda_1^{(k)} \geq \lambda_2^{(k)}$;

a multiplication unit configured to multiply, by each of the assigned weights, the OFDM modulation signals corresponding to each of the streams and acquire first signals and second signals;

an addition unit configured to add the first signals and the second signals, and acquire added signals;

an inverse Fourier transform unit configured to subject the added signals to inverse Fourier transform; and a transmission unit configured to transmit, to the receiving apparatus, signals output from the inverse Fourier transform unit.

16. The apparatus according to claim 15, wherein the weight assignment unit alternately assigns the weights corresponding to the singular values $\lambda_1^{(k)}$ and $\lambda_2^{(k)}$.

17. The apparatus according to claim 15, wherein the weight assignment unit alternately assigns the weights corresponding to the singular values $\lambda_1^{(k)}$ and $\lambda_2^{(k)}$ to groups of the subcarriers, the groups each including two or more of the subcarriers.

18. A radio communication method used in a radio communication apparatus for transmitting data to a receiving apparatus, comprising:

dividing the transmit data into a first stream and a second stream;

subjecting the first stream and the second stream to serial-to-parallel conversion to obtain a plurality of data signals;

modulating the data signals into a plurality of OFDM modulation signals corresponding to the first stream and the second stream using a plurality of subcarriers;

acquiring a plurality of channel responses between the radio communication apparatus and the receiving apparatus;

computing singular values $\lambda_1^{(k)}$ and $\lambda_2^{(k)}$ of a channel matrix corresponding to a $k^{th}$ (k is a natural number) subcarrier included in the subcarriers, based on the acquired channel responses;

assigning a plurality of weights corresponding to the singular values $\lambda_1^{(k)}$ and $\lambda_2^{(k)}$ to the first stream and the second stream where a correspondence of each weight to each stream is different by subcarrier;

multiplying, by each of the assigned weights, the OFDM modulation signals corresponding to each of the first stream and the second stream and acquiring first signals and second signals;

adding the first signals and the second signals, and acquiring added signals;

subjecting the added signals to inverse Fourier transform; and transmitting, to the receiving apparatus, signals output from the inverse Fourier transform unit.

19. A radio communication method used in a radio communication apparatus for transmitting data information to a receiving apparatus, comprising:

dividing the transmit data into at least three streams;

subjecting the streams to serial-to-parallel conversion to obtain a plurality of data signals;

modulating the data signals into a plurality of OFDM modulation signals corresponding to the at least three streams using a plurality of subcarriers;

acquiring a plurality of channel responses between the radio communication apparatus and the receiving apparatus;

computing singular values $\lambda_1^{(k)}, \lambda_2^{(k)}, \ldots, \lambda_m^{(k)}$ (m is a natural number not less than 3) of a channel matrix corresponding to a $k^{th}$ (k is a natural number) subcarrier included in the subcarriers, based on the acquired channel responses;

assigning a plurality of weights corresponding to the singular values $\lambda_1^{(k)}, \lambda_2^{(k)}, \ldots, \lambda_m^{(k)}$, to the streams where a correspondence of each weight to each stream is different by subcarrier, if $\lambda_1^{(k)} \geq \lambda_2^{(k)} \geq \ldots \geq \lambda_m^{(k)}$;

multiplying, by each of the assigned weights, the OFDM modulation signals corresponding to each of the streams and acquiring m signals;

adding the m signals to acquire added signals;

subjecting the added signals to inverse Fourier transform; and transmitting, to the receiving apparatus, signals obtained by the inverse Fourier transform.

20. A radio communication method used in a radio communication apparatus for transmitting data to a receiving apparatus, comprising:

dividing the transmit data into at least three streams;

subjecting the streams to serial-to-parallel conversion to obtain a plurality of data signals;

modulating the data signals into a plurality of OFDM modulation signals corresponding to the at least three streams using a plurality of subcarriers;

acquiring a plurality of channel responses between the radio communication apparatus and the receiving apparatus;

computing singular values $\lambda_1^{(k)}$ and $\lambda_2^{(k)}$ of a channel matrix corresponding to a $k^{th}$ (k is a natural number) subcarrier included in the subcarriers, based on the acquired channel responses;

assigning a plurality of weights corresponding to the singular values $\lambda_1^{(k)}$ and $\lambda_2^{(k)}$ to the OFDM modulation signals corresponding to two of the streams where a correspondence of each weight to each stream is different by subcarrier, if $\lambda_1^{(k)} \geq \lambda_2^{(k)}$;

multiplying, by each of the assigned weights, the OFDM modulation signals corresponding to each of the streams and acquiring first signals and second signals;

adding the first signals and the second signals to acquire added signals; subjecting the added signals to inverse Fourier transform; and transmitting, to the receiving apparatus, signals obtained by the inverse Fourier transform.

* * * * *